(12) United States Patent
Bauer et al.

(10) Patent No.: US 7,148,276 B2
(45) Date of Patent: Dec. 12, 2006

(54) GRANULAR FLAME-RETARDANT COMPOSITION

(75) Inventors: Harald Bauer, Kerpen (DE); Sebastian Hoerold, Diedorf (DE); Werner Krause, Huerth (DE); Martin Sicken, Cologne (DE)

(73) Assignee: Clariant GmbH, Frankfurt (DE)

( * ) Notice: Subject to any disclaimer, the term of this patent is extended or adjusted under 35 U.S.C. 154(b) by 269 days.

(21) Appl. No.: 10/656,398

(22) Filed: Sep. 5, 2003

(65) Prior Publication Data

US 2005/0101706 A1 May 12, 2005

(30) Foreign Application Priority Data

Sep. 6, 2002 (DE) ................. 102 41 375

(51) Int. Cl.
C08K 5/53 (2006.01)
(52) U.S. Cl. .................. 524/126; 524/133; 252/609
(58) Field of Classification Search ................ 524/126, 524/133; 252/609
See application file for complete search history.

(56) References Cited

U.S. PATENT DOCUMENTS

| | | | |
|---|---|---|---|
| 3,980,614 A * | 9/1976 | Noetzel et al. | 524/126 |
| 4,107,376 A * | 8/1978 | Ishikawa | 428/305.5 |
| 4,123,587 A * | 10/1978 | Wesch et al. | 428/407 |
| 5,021,488 A | 6/1991 | Fuhr et al. | 524/116 |
| 5,102,931 A | 4/1992 | Fuhr et al. | 524/126 |
| 5,191,000 A | 3/1993 | Fuhr et al. | 524/117 |
| 5,326,805 A | 7/1994 | Sicken et al. | 524/101 |
| 5,879,920 A | 3/1999 | Dale et al. | |
| 5,891,226 A * | 4/1999 | Kleiner et al. | 106/18.18 |
| 5,958,287 A | 9/1999 | Pullen | |
| 6,084,012 A | 7/2000 | Gareiss et al. | |
| 6,124,366 A | 9/2000 | Pullen et al. | |
| 6,207,736 B1 | 3/2001 | Nass et al. | 524/126 |
| 6,255,371 B1 | 7/2001 | Schlosser et al. | |
| 6,365,071 B1 | 4/2002 | Jenewein et al. | 252/609 |
| 6,509,401 B1 | 1/2003 | Jenewein et al. | 524/116 |
| 6,515,052 B1 * | 2/2003 | Semen | 524/115 |
| 6,716,899 B1 | 4/2004 | Klatt et al. | |
| 6,780,905 B1 * | 8/2004 | Bienmuller et al. | 524/100 |
| 2004/0176510 A1 | 9/2004 | Geprags | |
| 2004/0227130 A1 | 11/2004 | Hoerold | |
| 2005/0011401 A1 * | 1/2005 | Bauer et al. | 106/18.11 |
| 2005/0143503 A1 * | 6/2005 | Bauer et al. | 524/115 |

FOREIGN PATENT DOCUMENTS

| | | |
|---|---|---|
| DE | 1542058 | 10/1974 |
| DE | 41 39 625 | 6/1993 |
| DE | 196 50 563 | 6/1998 |
| DE | 197 34 437 | 2/1999 |
| DE | 197 37 727 | 7/1999 |
| DE | 190 20 399 | 11/1999 |
| DE | 19820399 | 11/1999 |
| DE | 198 27 845 | 12/1999 |
| EP | 0 584 567 | 3/1994 |
| EP | 0 899 296 | 3/1999 |
| EP | 0 990 652 | 4/2000 |
| EP | 1 081 190 | 3/2001 |
| GB | 1178847 | 1/1970 |
| GB | 1178848 | 1/1970 |
| GB | 1178849 | 1/1970 |
| WO | WO 96/16948 | 6/1996 |
| WO | WO 97/39053 | 10/1997 |
| WO | WO 98/08898 | 3/1998 |
| WO | WO 98/45364 | 10/1998 |

OTHER PUBLICATIONS

English abstract for DE 41 39 625.
English abstract for DE 196 50 563.
English abstract for EP 1 081 190.
English abstract for DE 198 20 399.
English abstract for DE 198 27 845.
U.S. Appl. No. 11/043,059, Bauer et al., filed Jun. 2, 2005.
U.S. Appl. No. 11/093,599 et al., filed Mar. 30, 2005.
U.S. Appl. No. 11/388,916, filed Mar. 24, 2006, by Bauer et al.

* cited by examiner

*Primary Examiner*—Peter Szekely
(74) *Attorney, Agent, or Firm*—Anthony A. Bisulca

(57) ABSTRACT

The invention relates to a flame retardant combination comprising, as component A, a phosphinate of the formula (I) and/or a diphosphinate of the formula (II) and/or polymers of these

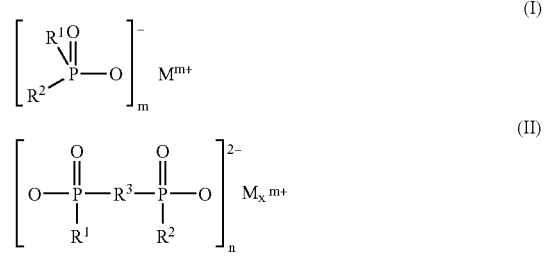

where
$R^1$ and $R^2$ are identical or different and are $C_1$–$C_6$-alkyl, linear or branched, and/or aryl; $R^3$ is $C_1$–$C_{10}$-alkylene, linear or branched, $C_6$–$C_{10}$-arylene, -alkylarylene or -arylalkylene; M is calcium ions, magnesium ions, aluminum ions and/or zinc ions, m is 2 or 3; n is 1 or 3; x is 1 or 2; and comprising a component B1, B2 and/or B3 wherein B1 is a salt of 1,3,5-triazine compound with polyphosphoric acid, and
wherein B2 is a melamine polymetaphosphate, and wherein B3 is a composite salt of polyphosphoric acid with melamine, melam and/or melem.

49 Claims, No Drawings

GRANULAR FLAME-RETARDANT COMPOSITION

The invention relates to a novel flame retardant combination and to its use, in particular in thermoplastic polymers.

The salts of phosphinic acids (phosphinates) have proven to be effective flame-retardant additives, in particular for thermoplastic polymers (DE-A-2 252 258 and DE-A-2 447 727). Calcium phosphinates and aluminum phosphinates have been described as particularly effective in polyesters, and impair the material properties of the polymer molding compositions less than when the alkali metal salts, for example, are used (EP-A-0 699 708).

Synergistic combinations of phosphinates with certain nitrogen-containing compounds have also been found and in very many polymers act as more effective flame retardants than the phosphinates alone (PCT/EP97/01664, DE-A-197 34 437, DE-A-197 37 727, U.S. Pat. No. 6,255,371).

The object of the present invention is therefore to provide improved flame retardant combinations which, even when used in small amounts, have excellent effectiveness as flame retardants in the appropriate plastics, in particular in thermoplastic polymers.

This object is achieved by a flame retardant combination comprising, as component A, a phosphinate of the formula (I) and/or a diphosphinate of the formula (II) and/or polymers of these

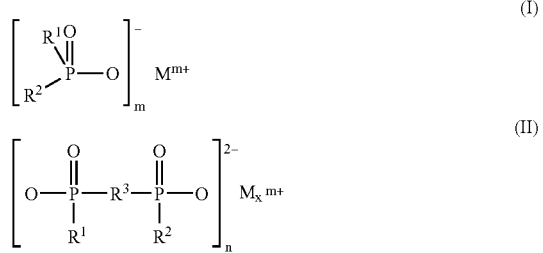

where

R$^1$ and R$^2$ are identical or different and are C$_1$–C$_6$-alkyl, linear or branched, and/or aryl;

R$^3$ is C$_1$–C$_{10}$-alkylene, linear or branched, C$_6$–C$_{10}$-arylene, -alkylarylene or -arylalkylene;

M is magnesium, calcium, aluminum or zinc, m is 2 or 3;

n is 1 or 3;

x is 1 or 2 and comprising, as component B, the component B1, B2 and/or B3 as described hereafter.

B1 is a salt of 1,3,5-triazine compound with polyphosphoric acid with a number average degree of condensation n is higher than 20 (preferably higher then 40) and with the melamine content amounting to more than 1.1 mole (preferably more than 1.2 mole) of melamine per mole of phosphorus atom.

Preferably the pH of a 10% slurry of that polyphosphate salt in water is higher than or equal to 4.5.

The manufacture of such component B1 is described, for example, in WO 00/02869. The content of that publication is hereby included by reference. The 1,3,5-triazine compound is converted with orthophosphoric acid at room temperature into the phosphate of the 1,3,5-triazin compound, after which this salt is converted into the polyphosphate of the 1,3,5-triazin compound via a thermal treatment.

The prefered 1,3,5-triazine compounds are melam, melem, melon, especially melamine, or mixtures of these compounds.

B2 is a melamine polymetaphosphate having a sulubility of from 0.01 to 0.10 g/100 ml in water at 25° C., a pH from 2.5 to 4.5 in the form of a 10 wt. % aqueous slurry at 25° C. and a melamine content of from 1.0 to 1.1 mol per mol of phosphorus atom. That component B2 and the process for its manufacture are described, for example, in WO 97/44377. The content of that publication is hereby included by reference. That component B2 is a melamine salt of a long-chain polyphosphoric acid represented by the formula (III)

(MHPO$_3$)$_n$ wherein M is melamine, H is a hydrogen atom, P is a phosphorus atom, and n is an integer and wherein the degree (n) of polymerization of a melamine salt of linear phosphoric acid is large. Melamine is represented by the formula (IV)

C$_3$N$_6$H$_6$.

B3 is a composite salt of polyphosphoric acid with melamine, melam and/or melem having a solubility in water (25° C.) of 0.01 to 0.10 g/100 ml, a pH of 4.0 to 7.0 as measured using a 10% by weight aqueous slurry (25° C.), and melamine, melam and melem contents of 0.05 to 1.00 mol (preferably 0.05 to 0.40 mol), 0.30 to 0.60 mol (preferably 0.30 to 0.60 mol) and 0.05 to 0.80 mol (preferably 0.30 to 0.80 mol), respectively, per mol of phosphorus atoms.

The process for preparing a composite salt (double salt) of polyphosphoric acid with melamine, melam and melem (Component B3) having a solubility in water (25° C.) of from 0.01 to 0.10 g/100 ml, a pH of from 4.0 to 7.0 as a 10 weight % aqueous slurry (25° C.), and a melamine content of 0.05 to 1.00 mol, a melam content of 0.30 to 0.60 mol, a melem content of 0.05 to 0.80 mol, respectively, (or the preferred amounts mentioned above) per mol of phosphorus atom, consists of the following steps:

(a) obtaining a reaction product by mixing melamine and phosphoric acid at a temperature of from 0 to 330° C. in such a ratio that the melamine is from 2.0 to 4.0 mols per mol of the phosphoric acid as calculated as orthophosphoric acid content, and (b) a step of baking the reaction product obtained in step (a) at a temperature of from 340 to 450° C. for from 0.1 to 30 hours. Preferably, the double salt has a low melamine content and a high melem content. In such case that aqueous slurry has a melamine content of from 0.05 to 0.40 mol, a melam content of from 0.30 to 0.60 mol and a melem content of from 0.30 to 0.80 mol, per mol of the phosphorus atom. In that preferred version of the process, the sublimate of the melamine is returned to the system and the formed ammonia is discharged out of the system during that step (b).

In that step (a) phosphoric acid is preferably an aqueous orthophosphoric acid solution having a concentration of orthophosphoric acid of not less than 50% by weight. In step (a), a mixing is carried out at a referred temperature of from 80 to 150° C. That component B3 and the process for its manufacture is described, for example, in more detail in WO 98/39306. The content of that publication is hereby included by reference.

That melamine, melam, melem double salt of a polyphosphoric acid (Component B3) is a melamine, melam, melem double salt of a chain polyphosphoric acid or a melamine, melam, melem double salt of metaphosphoric acid of the general formula (V):

$$\alpha(MmH)_2O.\beta(MdH)_2O.\gamma(MpH)_2O.\delta P_2O_5$$

(wherein Mm represents melamine, Md represents melam, Mp represents melem. H represents a hydrogen atom, P represents a phosphorus atom, O represents an oxygen atom, and $\alpha$, $\beta$, $\gamma$ and $\delta$ represent positive numbers, having an interrelation of $1 \leq (\alpha+\beta+\gamma)\delta < 2$. The melamine (Mm) is 2,4,6-triamino-1,3,5-triazine of the formula (VI):

$$C_3H_6N_5$$

The melam (Md) is (N-4,6-diamino-1,3,5-triazin-2-yl)-1,3,5-triazine-2,4,6-triamine of the formula (VII):

$$C_6H_9N_{11}$$

This is a 1,3,5-triazine derivative having two molecules of melamine condensed to have one molecule of ammonia desorbed therefrom. The melem (Mp) is 2,5,6-triamino-1,3,4,6,7,9,9b-heptaazaphenalene of the formula (VIII):

$$C_8H_6N_{10}$$

This is a 1,3,5-triazine derivative having two molecules of melamine condensed to have two molecules of ammonia desorbed therefrom.

Surprisingly, it has now been found that the above mentioned combination, have markedly more effective flame retardancy than the known combinations of similar types.

$R^1$ and $R^2$ of the formula (I) are preferably identical or different and are $C_1$–$C_6$-alkyl, linear or branched, and/or aryl.

$R^1$ and $R^2$ are particularly preferably identical or different and are methyl, ethyl, n-propyl, isopropyl, n-butyl, tert-butyl, n-pentyl and/or phenyl.

$R^3$ is preferably methylene, ethylene, n-propylene, isopropylene, n-butylene, tert.-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene.

M is preferably aluminum ions or zinc ions.

The invention also relates to the use of the novel flame retardant combination for rendering thermoplastic polymers flame-retardant.

For the purposes of the present invention, thermoplastic polymers are, as stated by Hans Domininghaus in "Die Kunststoffe und ihre Eigenschaften", 5$^{th}$ Edition (1998). p. 14, polymers having molecular chains with no side branches or with side branches varying in their length and number, and which soften when heated and can be shaped in almost any desired way.

The thermoplastic polymers are preferably HIPS (high-impact polystyrene), polyphenylene ethers, polyamides, polyesters, polycarbonates and blends or polymer blends of the type ABS (acrylonltrile-butadiene-styrene) or PC/ABS (polycarbonate/acrylonitrile-butadiene-styrene) or PPE/HIPS (polyphenylene ether/high-impact polystyrene). High-impact polystyrene is a polystyrene with increased impact strength.

Particularly preferred thermoplastic polymers are polyamides, polyesters and blends of PPE/HIPS.

Thermoplastic polymers which comprise the novel flame retardant combinations and, if desired, fillers and reinforcing materials and/or other additives, as defined below, are hereinafter termed plastic molding compositions.

For the above mentioned use it is preferable for each of the components A and B, independently of one another, to be used at a concentration of from 1 to 30% by weight, based on the plastic molding composition.

For the above mentioned use it is preferable for each of the components A and B, independently of one another, to be used at a concentration of from 3 to 20% by weight, based on the plastic molding composition.

For the above mentioned use it is preferable for each of the components A and B, independently of one another, to be used at a concentration of from 3 to 15% by weight, based on the plastic molding composition.

Finally, the invention also provides a flame-retardant plastic molding composition comprising the novel flame retardant combination. The plastic is preferably thermoplastic polymers of the type HIPS (high-impact polystyrene), polyphenylene ethers, polyamides, polyesters, polycarbonates and blends or polymer blends of the type ABS (acrylonitrile-butadiene-styrene) or PC/ABS (polycarbonate/acrylonitrile-butadiene-styrene) or PPE/HIPS (polyphenylene ether/high-impact polystyrene).

The polymers of the flame-retardant plastic molding composition are particularly preferably polyamide or polyester or blends of PPE/HIPS.

The thermoplastic polymers in which the novel flame retardant combinations can be used effectively are described in the international patent application PCT/WO 97/01664.

These include:

1. Polymers of mono- or diolefins, for example polypropylene, polyisobutylene, polybutylene, poly-1-butene, polyisoprene and polybutadiene, and also polymers of cycloolefins, for example of cyclopentene or of norbornene; also polyethylene, which may have crosslinking if desired; e.g. high-density polyethylene (HDPE), high-density high-molecular-weight polyethylene (HDPE-HMW), high-density ultrahigh-molecular-weight polyethylene (HDPE-UHMW), medium-density polyethylene (MDPE), low-density polyethylene (LDPE), linear low-density polyethylene (LLDPE), or low-density branched polyethylene (VLDPE).

2. Mixtures of the above mentioned polymers, for example mixtures of polypropylene with polyisobutylene, polypropylene with polyethylene (e.g.: PP/HDPE, PP/LDPE) and mixtures of various polyethylene grades, for example LDPE/HDPE.

3. Copolymers of mono- or of diolefins with one another or with other vinyl monomers, e.g. ethylene-propylene copolymers, linear low-density polyethylene (LLDPE) and mixtures of the same with low-density polyethylene (LDPE), propylene-1-butene copolymers, propylene isobutylene copolymers, ethylene-1-butene copolymers, etc.; and also ethylene-alkyl acrylate copolymers, ethylene-vinyl acetate copolymers and copolymers of these with carbon monoxide, and ethylene-acrylic acid copolymers and salts of these (ionomers), and also terpolymers of ethylene with propylene and with a diene, such as hexadiene, dicyclopentadiene or ethylidenenorbornene; and also mixtures of copolymers of this type with one another or with the polymers mentioned under 1., e.g. polypropyleneethylene-propylene copolymers, LDPE/ethylene-vinyl acetate copolymers, LDPE/ethylene-acrylic acid copolymers, LLDPE/ethylene-vinyl acetate copolymers, LLDPE/ethytene-acrylic acid copolymers, and polyalkylene-carbon monoxide copolymers of alternating or random structure and mixtures of these with other polymers, e.g. with polyamides.
4. Polystyrene, poly(p-methylstyrene), poly(α-methylstyrene).
5. Copolymers of styrene or α-methylstyrene with dienes or with acrylics, e.g. styrene-butadiene, styrene-acylonitrile, styrene-alkyl methacrylate, styrene-butadiene-alkyl acrylate, styrene-butadiene-alkyl methacrylate, styrene-maleic anhydride, styrene-acrylonitrile-methacrylate; high-impact-strength mixtures made from styrene copolymers with another polymer, e.g. with a polyacrylate, with a diene polymer or with an ethylene-propylene-diene terpolymer; and also block copolymers of styrene, e.g. styrene-butadiene-styrene, styrene-isoprene-styrene, styrene-ethylene/butylene-styrene or styrene-ethylene/propylene-styrene.
6. Graft copolymers of styrene or α-methylstyrene. e.g. styrene on polybutadiene, styrene on polybutadiene-styrene copolymers or on polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic imide on polybutadiene, styrene and maleimide on polybutadiene; styrene and alkyl acrylates and, respectively, alkyl methacrylates on polybutadiene; styrene and acrylonitrile on ethylene-propylene-diene terpolymers; styrene and acrylonitrile on polyalkyl acrylates or on polyalkyl methacrylates; styrene and acrylonitrile on acrylate-butadiene copolymers, and also mixtures of these with the polymers mentioned under 5., known as ABS polymers, MBS polymers, ASA polymers or AES polymers, for example.
7. Halogen-containing polymers, e.g. polychloroprene, chlorinated rubber, chlorinated or brominated copolymer made from isobutylene-isoprene (halogenated butyl rubber), chlorinated or chlorosulfonated polyethylene, copolymers of ethylene with chlorinated ethylene, epichlorohydrin homo- and copolymers, in particular polymers made from halogen-containing vinyl compounds, e.g. polyvinyl chloride, polyvinylidene chloride, polyvinyl fluoride, polyvinylidene fluoride; and also copolymers of these, for example vinyl chloride-vinylidene chloride, vinyl chloride-vinyl acetate and vinylidene chloride-vinyl acetate.
8. Polymers derived from α,β-unsaturated acids or from derivatives of these, for example polyacrylates and polymethacrylates, butyl-acrylate-impact-modified polymethyl methacrylates, polyacrylamides and polyacrylonitriles.
9. Copolymers of the monomers mentioned under 8, with one another or with other unsaturated monomers, e.g. acrylonitrile-butadiene copolymers, acrylonitile-alkyl acrylate copolymers, acrylonitrile-alkoxyalkyl acrylate copolymers, acrylonitrile-vinyl halide copolymers and acrylonltrile-alkyl methacrylate-butadiene terpolymers.
10. Polymers derived from unsaturated alcohols and amines and respectively, from their acetyl derivatives or acetals, for example polyvinyl alcohol, polyvinyl acetate, polyvinyl stearate, polyvinyl benzoate, polyvinyl maleate, polyvinyl butyral, polyallylphthalate, polyallylmelamine; and also copolymers of these with the olefins mentioned under 1.
11. Polyacetals, such as polyoxymethylene, and also those polyoxymethylenes which contain comonomers, e.g. ethylene oxide; polyacetals modified with thermoplastic polyurethanes, with acrylates or with MBS.
12. Polyphenylene oxides, polyphenylene sulfides and mixtures of these oxides or sulfides with styrene polymers or with polyamides.
13. Polyamides and copolyamides derived from diamines and from dicarboxylic acids and/or from aminocarboxylic acids or from the corresponding lactams, for example nylon-4, nylon-6, nylon-6,6, 6,10, 6,9, 6,12, 4,6 12,12, nylon-11, nylon-12, aromatic polyamides based on m-xylene, diamine and adipic acid; polyamides prepared from hexamethylenediamine and iso- and/or terephthalic acid and, if desired, from an elastomer as modifier, e.g. poly-2,4,4-trimethylhexamethylene-terephthalamide or poly-m-phenyleneisophthalamide. Block copolymers of the above mentioned polyamides with polyolefins, with olefin copolymers, with ionomers or with chemically bonded or grafted elastomers; or with polyethers, e.g. with polyethylene glycol, polypropylene glycol or polytetramethylene glycol. EPDM- or ABS-modified polyamides or copolyamides; and also polyamides condensed during processing ("IM polyamide systems").
14. Polyureas, polyimides, polyamideimides, polyetherimides, polyesterimides, polyhydantoins and polybenzimidazoles.
15. Polyesters derived from dicarboxylic acids and from dialcohols and/or from hydroxycarboxypic acids or from the corresponding lactones, for example polyethylene terephthalate, polybutylene terephthalate, poly-1,4-dimethylol-cyclohexane terephthalate, polyhydroxybenzoates, and also block polyetheresters drived from polyethers having hydroxyl end groups; polyesters modified with polycarbonates or with MBS.
16. Polycarbonates and polyester carbonates.
17. Polysulfones, polyether sulfones and polyether ketones.
18. Mixtures (polyblends) of the above mentioned polymers, e.g. PP/EPDM, polyamide/EPDM or ABS, PVC/EVA, PVC/ABS, PVC/MBS, PC/ABS, PBTP/ABS, PP/ASA, PC/PBT, PVC/CPE, PVC/acrylates, POM/thermoplastic PU, PC/thermoplastic PU, POM/acrylate, POM/MBS, PPO/HIPS, PPO/nylon-6,6 and copolymers.

The term "phosphinate" used below covers salts of phosphinic and of diphosphinic acid and polymers of these.

The phosphinates, which are prepared in an aqueous medium, are essentially monomeric compounds. Depending on the reaction conditions, polymeric phosphinates can be produced under some circumstances.

Examples of phosphinic acids suitable as a constituent of the phosphinates are:
Dimethylphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid and diphenylphosphinic acid.

The phosphinates according to the invention may be prepared by known methods, for example as described in some detail in EP-A-0 699 708. The phosphinic acids are reacted, for example, in aqueous solution with metal carbonates, with metal hydroxides or with metal oxides.

The amount of the phosphinate to be added to the polymers may vary within wide limits. Use is generally made of from 1 to 30% by weight, based on the plastic molding composition. The ideal amount depends on the nature of the polymer and on the type of component B, and on the type of phosphinate itself used. Preference is given to from 3 to 20% by weight, in particular from 3 to 15% by weight, based on the plastic molding composition.

The above mentioned phosphinates may be used in various physical forms for the novel flame retardant combination, depending on the nature of the polymer used and on the properties desired. For example, to achieve better dispersion in the polymer the phosphinate may be ground to a fine-particle form. Mixtures of different phosphinates may also be used, if desired.

The phosphinates as used according to the invention in the flame retardant combination are thermally stable, and neither decompose the polymers during processing nor affect the process of preparing the plastic molding composition. The phosphinates are not volatile under the customary conditions of preparation and processing of thermoplastic polymers.

The amount of the component B to be added to the polymers may likewise vary within wide limits. Use is generally made of from 1 to 30% by weight, based on the plastic molding composition. The ideal amount depends on the nature of the polymer, on the nature of the phosphinate used (component A) and on the nature of the component (B). Preferred amounts are from 3 to 20% by weight, in particular from 3 to 15% by weight.

The flame-retardant components A and B may be incorporated into thermoplastic polymers by, for example, premixing all of the constituents in powder and/or pellet form in a mixer and then homogenizing these in a polymer melt in a compounding assembly (e.g. a twin-screw extruder). The melt is usually drawn off as an extrudate, cooled and pelletized. Components A and B may also be introduced separately by way of a metering system directly into the compounding assembly.

It is also possible to admix the flame-retardant components A and B with finished polymer pellets or powder, and to process the mixture directly on an injection molding machine to give moldings.

In the case of polyesters, for example, the flame-retardant additives A and B may also be added into the polyester composition as early as during the polycondensation.

Besides the novel flame retardant combination made from A and B, fillers and reinforcing material, for example glass fibers, glass beads or minerals, such as chalk, may be added to the molding compositions. The molding compositions may also comprise other additives, such as antioxidants, light stabilizers, lubricants, colorants, nucleating agents or antistats. Examples of additives which may be used are given in EP-A-584 567.

The flame-retardant plastic molding compositions are suitable for producing moldings, films, filaments or fibers, for example by injection molding, extrusion or pressing.

EXAMPLES

Chemicals Used:

Polymer (Granule):

Polyamide 6.6 (PA 6.6GV): ®Durethan AKV 30 (Bayer AG, D) contains 30% glass fibres Flame Retardants:

Component A: aluminum salt of diethylphosphinic acid, called DEPAL in the following Component B1: melamine polyphosphate, degree of condensation (31P-NMR) higher than 20, pH of a 10% slurry 4,9, 43% nitrogen, 13% phosphorus;

Component B2: melamine polyphosphate, pH of a 10% slurry 2,9, 40% nitrogen, 14, 4% phosphorus;

Component B3: melamine polyphosphate, pH of a 10% slurry 4,5, 43% nitrogen, 13% phosphorus, contains 0.3 mol % melem (XRD);

Component C (comparison): melamine pyrophosphate Budit 311 (Chemische Fabrik Budenheim, D), degree of condensation (31P-NMR) 2, pH of a 10% slurry 4,1, 39% nitrogen, 14% phosphorus;

TABLE 1

Flame retarded glass fibers reinforced polyamide 6.6 compounds. Examples 1–4 are for comparison, example 5–7 are according to the invention

| Example | A | B1 | B2 | B3 | C | UL 94 (0.8 mm) class |
|---|---|---|---|---|---|---|
| 1 comp. | 20 | | | | | n.c. |
| 2 comp. | | 20 | | | | n.c. |
| 3 comp. | | | 20 | | | n.c. |
| 3 comp. | | | | 20 | | n.c. |
| 4 comp. | 10 | | | | 10 | n.c. |
| 5 inv. | 10 | 10 | | | | V-0 |
| 6 inv. | 10 | | 10 | | | V-0 |
| 7 inv. | 10 | | | 10 | | V-0 | n.c. = not classified

The use of component A, B1, B2 or B3 as the only flame retardant in polyamide 6.6 does not gve the required flame retardancy. The combination of component A with a melamine pyrophosphate (component C) does not give a sufficient flame retardancy. The combination of Depal with the melamine polyphosphate B1, B2 or B3 according to the invention give a UL 94 V-0 classification.

The invention claimed is:

1. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol, wherein the organophosphorus flame retardant is selected from the group consisting of a phosphinic salt of the formula (I), a diphosphinic salt of the formula (II), a polymer of the phosphic salt of formula (I), a polymer of the diphosphinic salt of formula (II) and mixtures thereof (component A),

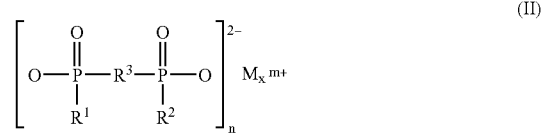

where $R^1$ and $R^2$ are identical or different and are $C_1$–$C_8$-alkyl, linear or branched, or aryl;

$R^3$ is $C_1$–$C_{10}$-alkylene, linear or branched, $C_6$–$C_{10}$-arylene, -alkylarylene, or -arylalkylene;

M is Mg, Ca, Al, Sb, Sn, Ge, Ti, Zn, Fe, Zr, Ce, Bi, Sr, Mn, Li, Na, K, or a protonated nitrogen base;

m is from 1 to 4;
n is from 1 to 4;
x is from 1 to 4.

2. The granular flame-retardant composition as claimed in claim 1, wherein M is calcium, aluminum or zinc.

3. The granular flame-retardant composition as claimed in claim 1, wherein $R^1$ and $R^2$ are identical or different and are $C_1$–$C_6$-alkyl, linear or branched, or phenyl.

4. The granular flame-retardant composition as claimed in claim 1, wherein $R^1$ and $R^2$ are identical or different, and are methyl, ethyl, n-propyl, isopropyl, n-butyl, tert-butyl, n-pentyl, or phenyl.

5. The granular flame-retardant composition as claimed in claim 1, wherein $R^3$ is methylene, ethylene, n-propylene, isopropylene, n-butylene, tert-butylene, n-pentylene, n-octylene, or n-dodecylene; phenylene; naphthylene; methylphenylene, ethylphenylene, tert-butylphenylene, methylnapthylene, ethylnaphthylene,; tert-butylnaphthylene; phenylmethylene, phenylethylene, phenylpropylene, or phenylbutylene.

6. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises a compound selected from the group consisting of melamine phosphate, dimelamine phosphate, melamine pyrophosphate, melamine polyphosphates, melam polyphosphates, melem polyphosphates, and melon polyphosphates.

7. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises at least one melamine condensation product selected from the group consisting of melam, melem, and melon.

8. The granular flame-retardant composition as claimed in claim 1, wherein the composition further comprises a compound selected from the group consisting of oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, dicyandiamide, and guanidine.

9. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises nitrogen-containing phosphates of the formulae $(NH_4)_y H_{3-y} PO_4$ and, respectively, $(NH_4 PO_3)_z$, where y is from 1 to 3 and z is from 1 to 10 000.

10. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises as component B, a compound selected from the group consisting of a synthetic inorganic compound and a mineral product.

11. The granular flame-retardant composition as claimed in claim 10, wherein component B is selected from the group consisting of an oxygen compound of silicon, magnesium compounds, metal carbonates of metals of the second main group of the Periodic Table, red phosphorus, zinc compounds, and aluminum compounds.

12. The granular flame-retardant composition as claimed in claim 11, wherein the oxygen compounds of silicon is selected from the group consisting of salts and esters of orthosilicic acid and condensation products thereof, silicates, zeolites, silicas, glass powder, glass/ceramic powder, and ceramic powder; wherein the magnesium compounds are selected from the group consisting of magnesium hydroxide, hydrotalcites, magnesium carbonates, and magnesium calcium carbonates; wherein the zinc compounds are selected from the group consisting of zinc oxide, zinc stannate, zinc hydroxystannate, zinc phosphate, zinc borate, and zinc sulfides; and wherein the aluminum compounds are selected from the group consisting of aluminum hydroxide and aluminum phosphate.

13. The granular flame-retardant composition as claimed in claim 1, wherein the composition further comprises at least one nitrogen compound as further component C.

14. The granular flame-retardant composition as claimed in claim 13, wherein the nitrogen compounds are those of the formulae (III) to (VIII) or mixtures thereof

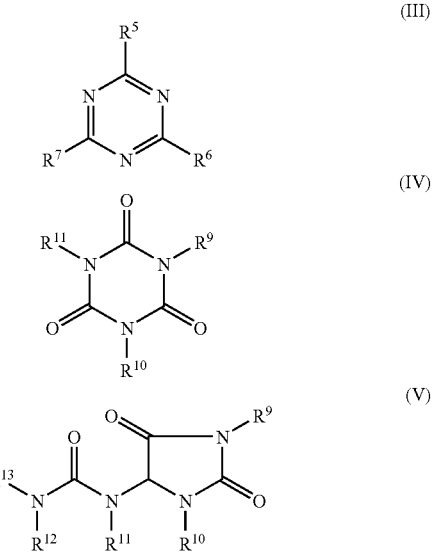

-continued

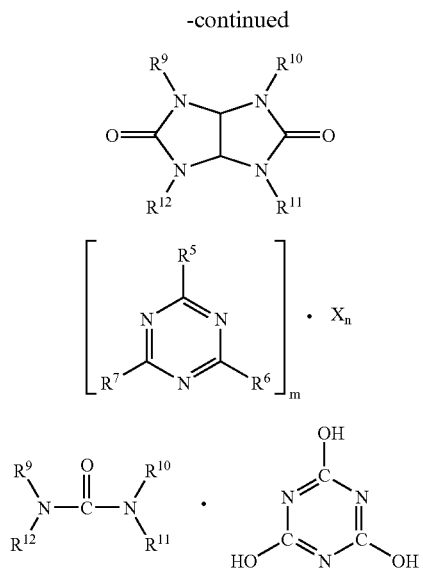

(VI)

(VII)

(VIII)

where
R⁵ to R⁷ are hydrogen, $C_1$–$C_8$-alkyl, or $C_6$–$C_{16}$-cycloalkyl or -alkylcycloalkyl, unsubstituted or substituted with a hydroxy function or with a $C_1$–$C_4$-hydroxyalkyl function, $C_2$–$C_8$-alkenyl, $C_1$–$C_6$-alkoxy, -acyl, -acyloxy, $C_6$–$C_{12}$-aryl -arylalkyl, —OR⁸, —N(R⁸)R⁹, N-alicyclic systems or N-aromatic systems, R⁸ is hydrogen, $C_1$–$C_8$-alkyl, $C_5$–$C_{16}$-cycloalkyl or -alkylcycloalkyl, unsubstituted or substituted with a hydroxy function or with a $C_1$–$C_4$-hydroxyalkyl function, $C_2$–$C_8$-alkenyl, $C_1$–$C_8$-alkoxy, -acyl, -acyloxy, $C_6$–$C_{12}$-aryl or -arylalkyl, R⁹ to R¹³ are the groups of R⁸, or —O—R⁸, m and n, independently of one another, are 1, 2, 3, or 4, X is an acid which can form adducts with triazine compounds (III).

15. A granular flame-retardant composition comprising an organophosphorus flame-retardant component, and at least one binder, and wherein the composition further comprises at least one carbodilmide.

16. A granular flame-retardant composition comprising an organophosphorus flame-retardant component, and at least one binder, wherein the at least one binder comprises alkylalkoxylates having from 8 to 22 carbon atoms and from 1 to 80 EO units per mole of alcohol.

17. A granular flame-retardant composition comprising an organophosphorus flame-retardant component, and of at least one binder, wherein the at least one binder is selected from the group consisting of caprolactam and triphenyl phosphate, wherein the organophosphorus flame retardant is selected from the group consisting of a phosphinic salt of the formula (I), a diphosphinic salt of the formula (II), a polymer of the phosphic salt of formula (I), a polymer of the diphosphinic salt of formula (II) and mixtures thereof (component A),

(I)

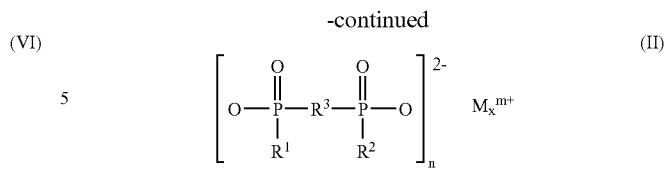

(II)

where
R¹ and R² are identical or different and are $C_1$–$C_8$-alkyl, linear or branched, or aryl;
R³ is $C_1$–$C_{10}$-alkylene, linear or branched, $C_6$–$C_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, or a protonated nitrogen base;
m is from 1 to 4;
n is from 1 to 4;
x is from 1 to 4.

18. A granular flame-retardant composition comprising an organophosphorus flame-retardant component, and of at least one binder, wherein the at least one binder is selected from the group consisting of ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and mixtures thereof.

19. The granular flame-retardant composition as claimed claim 1, wherein the composition has a median particle size of from 100 to 10 000 μm.

20. The granular flame-retardant composition as claimed in claim 1, wherein the composition has an average bulk density of from 200 to 1 500 g/l.

21. The granular flame-retardant composition as claimed in claim 1; wherein the ratio of the amount of the at least one binder to that of the organophosporus flame-retardant component is from 1:99 to 1:0.11.

22. A process for preparing granular flame-retardant composition, comprising the steps of adding, in a mixer, at least one binder in liquid form to an organophosphorus flame-retardant component, which has been set in motion, and mixing for a time period of from 0.01 to 1 hour at a temperature between 50 to 300° C.

23. A process for preparing granular flame-retardant composition, comprising the steps of adding, in a mixer, at least one binder in solid form to an organophosporus flame-retardant component, which has been set in motion, mixing at a temperature from 50 to 300° C. for from 0.01 to 1 hour, and during the process heating to the melting point of the at least one binder.

24. A flame-retardant polymer molding composition comprising a granular flame-retardant composition as claimed in claim 1.

25. The flame-retardant polymer molding composition as claimed in claim 24 further comprising
from 1 to 50% by weight of granular flame-retardant composition,
from 1 to 99% by weight of thermoplastic polymer or a mixture of thermoplastic polymers, and
from 0 to 60% by weight of filler.

26. The flame-retardant polymer molding composition as claimed in claim 24, further comprising
from 5 to 30% by weight of granular flame-retardant composition, from 5 to 90% by weight of the thermoplastic polymer or a mixture of thermoplastic polymers, and
from 5 to 40% by weight of filler.

27. The flame-retardant polymer molding composition as claimed in claim 24, further comprising at least one of at least one nitrogen compound and a synthetic inorganic compound or mineral product.

28. The flame-retardant polymer molding composition as claimed in claim 25, wherein the thermoplastic polymer or mixture of thermoplastic polymers are selected from the group consisting of HI (high-impact) polystyrene, polyphenylene ethers, polyamides, polyesters, polycarbonates, and blends or polyblends represented by ABS (acrylonitrile-butadiene-styrene), or PC/ABS (polycarbonate/acrylonitrile-butadiene-styrene).

29. The flame-retardant polymer molding composition as claimed in claim 25, wherein the thermoplastic polymer or the mixture of thermoplastic polymers are selected from the group consisting of polyamide, polyester, and ABS.

30. A polymer article comprising a granular flame-retardant composition as claimed in claim 1, wherein the article is selected from the group consisting of a polymer molding, a polymer film, a polymer filament and a polymer fiber.

31. A polymer article as claimed in claim 30; wherein the polymer is a thermoplastic or thermoset polymer.

32. A polymer article as claimed in claim 31, wherein the thermoplastic polymer is selected from HI (high-impact) polystyrene, polyphenylene ethers, polyamides, polyesters, polycarbonates, or blends or polyblends represented by ABS (acrylonitrile-butadiene-styrene), or PC/ABS (polycarbonate/acrylonitrile-butadiene-styrene), polyamide, polyester, and ABS.

33. A polymer article as claimed in claim 31, wherein the thermoset polymer is selected from the group consisting of formaldehyde polymers, epoxy polymers, melamine polymers, or phenolic resin polymers, and polyurethanes.

34. A polymer article as claimed in claim 30, comprising
from 1 to 50% by weight of granular flame-retardant composition,
from 1 to 99% by weight of polymer or a mixture of polymers, and
from 0 to 60% by weight of filler.

35. A polymer article as claimed in claim 30, comprising:
from 5 to 30% by weight of granular flame-retardant composition,
from 5 to 90% by weight of polymer or a mixture of polymers, and
from 5 to 40% by weight of filler.

36. The granular flame-retardant composition as claimed in claim 1, wherein the at least one binder is selected from the group consisting of carnauba waxes and montan waxes.

37. A granular flame-retardant composition comprising an organophosphorus flame-retardant component, and of at least one binder, wherein the at least one binder comprises phenolic resins, wherein the organophosphorus flame retardant is selected from the group consisting of a phosphinic salt of the formula (I), a diphosphinic salt of the formula (II), a polymer of the phosphic salt of formula (I), a polymer of the diphosphinic salt of formula (II) and mixtures thereof (component A),

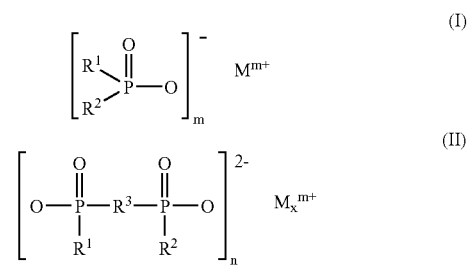

where
R¹ and R² are identical or different and are $C_1$–$C_6$-alkyl, linear or branched, or aryl;
R³ is $C_1$–$C_{10}$-alkylene, linear or branched, $C_6$–$C_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, or a protonated nitrogen base;
m is from 1 to 4;
n is from 1 to 4;
x is from 1 to 4.

38. The granular flame retardant composition as claimed in claim 1, wherein the composition has a median particle size from 200 to 2000 μm.

39. The granular flame-retardant composition as claimed in claim 1, wherein the composition has an average bulk density of from 300 to 800 g/l.

40. The granular flame-retardant composition as claimed in claim 1, wherein the ratio of the amount of the at least one binder to that of the organophosporus flame-retardant component is from 1:49 to 1:0.25.

41. The granular flame-retardant composition as claimed in claim 1, wherein the ratio of the amount of the at least one binder to that of the organophosporus flame-retardant component is from 1:19 to 1:1.

42. A flame retardant polymer molding composition comprising a granular flame-retardant composition as claimed in claim 15.

43. A flame retardant polymer molding composition comprising a granular flame-retardant composition as claimed in claim 16.

44. A flame retardant polymer molding composition comprising a granular flame-retardant composition as claimed in claim 17.

45. A flame retardant polymer molding composition comprising a granular flame-retardant composition as claimed in claim 18.

46. A granular flame-retardant composition made in accordance with the process of claim 22.

47. A flame retardant polymer molding composition comprising a granular flame-retardant composition as claimed in claim 46.

48. A granular flame-retardant composition made in accordance with the process of claim 23.

49. A flame retardant polymer molding composition comprising a granular flame-retardant composition as claimed in claim 48.

* * * * *

UNITED STATES PATENT AND TRADEMARK OFFICE
CERTIFICATE OF CORRECTION

| | | |
|---|---|---|
| PATENT NO. | : 7,148,276 B2 | |
| APPLICATION NO. | : 10/656398 | |
| DATED | : December 12, 2006 | |
| INVENTOR(S) | : Bauer et al. | |

It is certified that error appears in the above-identified patent and that said Letters Patent is hereby corrected as shown below:

The title page showing an illustrative figure, should be deleted and substitute therefore the attached title page.

Please delete column 1 line 1 through column 14 line 59 and insert column 1 line 1 through column 22 line 29, as attached Signed and Sealed this First Day of July, 2008

JON W. DUDAS
*Director of the United States Patent and Trademark Office*

(12) United States Patent
Bauer et al.

(10) Patent No.: US 7,148,276 B2
(45) Date of Patent: Dec. 12, 2006

(54) GRANULAR FLAME-RETARDANT COMPOSITION

(75) Inventors: Harald Bauer, Kerpen (DE); Sebastian Hoerold, Diedorf (DE); Werner Krause, Huerth (DE); Martin Sicken, Cologne (DE)

(73) Assignee: Clariant GmbH, Frankfurt (DE)

( * ) Notice: Subject to any disclaimer, the term of this patent is extended or adjusted under 35 U.S.C. 154(b) by 269 days.

(21) Appl. No.: 10/656,398

(22) Filed: Sep. 5, 2003

(65) Prior Publication Data
US 2005/0101706 A1 May 12, 2005

(30) Foreign Application Priority Data
Sep. 6, 2002 (DE) .................. 102 41 375

(51) Int. Cl.
C08K 5/53 (2006.01)
(52) U.S. Cl. .................. 524/126; 524/133; 252/609
(53) Field of Classification Search .......... 524/126, 524/133; 252/609
See application file for complete search history.

(56) References Cited

U.S. PATENT DOCUMENTS

| | | | |
|---|---|---|---|
| 3,980,614 A * | 9/1976 | Noetzel et al. | 524/126 |
| 4,107,376 A * | 8/1978 | Ishikawa | 428/305.5 |
| 4,123,587 A * | 10/1978 | Wesch et al. | 428/407 |
| 5,021,488 A | 6/1991 | Fuhr et al. | 524/116 |
| 5,102,931 A | 4/1992 | Fuhr et al. | 524/126 |
| 5,191,000 A | 3/1993 | Fuhr et al. | 524/117 |
| 5,326,805 A | 7/1994 | Sicken et al. | 524/101 |
| 5,879,920 A | 3/1999 | Dale et al. | |
| 5,891,226 A * | 4/1999 | Kleiner et al. | 106/18.18 |
| 5,958,287 A | 9/1999 | Pullen | |
| 6,084,012 A | 7/2000 | Gareiss et al. | |
| 6,124,366 A | 9/2000 | Pullen et al. | |
| 6,207,736 B1 | 3/2001 | Nass et al. | 524/126 |
| 6,255,371 B1 | 7/2001 | Schlosser et al. | |
| 6,365,071 B1 | 4/2002 | Jenewein et al. | 252/609 |
| 6,509,401 B1 | 1/2003 | Jenewein et al. | 524/116 |
| 6,515,052 B2 * | 2/2003 | Semen | 524/115 |
| 6,716,899 B1 | 4/2004 | Klatt et al. | |
| 6,780,905 B2 * | 8/2004 | Biesmuller et al. | 524/100 |
| 2004/0176510 A1 | 9/2004 | Gepraegs | |
| 2004/0227130 A1 | 11/2004 | Hoerold | |
| 2005/0011401 A1 * | 1/2005 | Bauer et al. | 106/18.11 |
| 2005/0143503 A1 * | 6/2005 | Bauer et al. | 524/115 |

FOREIGN PATENT DOCUMENTS

| | | |
|---|---|---|
| DE | 1542058 | 10/1974 |
| DE | 41 39 625 | 6/1993 |
| DE | 196 50 563 | 6/1998 |
| DE | 197 34 437 | 2/1999 |
| DE | 197 37 727 | 7/1999 |
| DE | 198 20 399 | 11/1999 |
| DE | 19820399 | 11/1999 |
| DE | 198 27 845 | 12/1999 |
| EP | 0 584 567 | 3/1994 |
| EP | 0 899 296 | 3/1999 |
| EP | 0 990 652 | 4/2000 |
| EP | 1 081 190 | 3/2001 |
| GB | 1178847 | 1/1970 |
| GB | 1178848 | 1/1970 |
| GB | 1178849 | 1/1970 |
| WO | WO96/16948 | 6/1996 |
| WO | WO97/39053 | 10/1997 |
| WO | WO98/08898 | 3/1998 |
| WO | WO98/45364 | 10/1998 |

OTHER PUBLICATIONS

English abstract for DE 41 39 625.
English abstract for DE 196 50 563.
English abstract for EP 1 081 190.
English abstract for DE 198 20 399.
English abstract for DE 198 27 845.
U.S. Appl. No. 11/043,039, Bauer et al., filed Jun. 2, 2005.
U.S. Appl. No. 11/093,599 et al., filed Mar. 30, 2005.
U.S. Appl. No. 11/388,916, filed Mar. 24, 2006, by Bauer et al.

* cited by examiner

*Primary Examiner*—Peter Szekely
(74) *Attorney, Agent, or Firm*—Anthony A. Bisulca

(57) ABSTRACT

The invention relates to a granular flame-retardant composition composed of an organophosphorus flame-retardant component and of a binder, to a process for preparing these flame-retardant compositions, and to polymer molding compositions which comprise the flame-retardant compositions.

49 Claims, No Drawings

GRANULAR FLAME-RETARDANT COMPOSITION

The present invention relates to a granular flame-retardant composition, and also to a process for preparing this granular flame-retardant composition, and to the use of the composition.

Organophosphorus compounds are used as flame retardants for plastics such as polyamides or polyesters.

In the abovementioned application sectors, the processing of the organophosphorus flame-retardant component can be made more difficult by its low bulk density. Low bulk density makes infeed of the material into continuously operating machines more difficult, especially in the case of extruders used with plastics injection molding machines. The result can be non-uniform dispersion of the material in the polymer.

DE 196 50 563 A1 describes pellets comprising a thermoplastic polymer, a graft polymer, a thermoplastic copolymer, and a flame retardant comprising iminophosphoranes.

EP 1 081 190 A1 describes flame-retardant thermoplastic molding compositions comprising at least one of the following components: high-molecular-weight syndiotactic polymer based on vinylaromatic monomers and on polyphenylene ether, vinylaromatic amorphous polymer, and flame retardant.

DE 41 39 625 A1 describes pellets composed of polyphenylene ether, vinylaromatic polymers, and an aromatic phosphite.

EP 0 899 296 A2 describes polymer molding compositions comprising a synergistic flame retardant combination for thermoplastic polymers, these being composed of a salt of 1-hydroxydihydrophosphole oxides with another component from the group of benzoguanamine, tris(hydroxyethyl) isocyanurate, allantoin, glycoluril, and also melamine cyanurate, melamine phosphate, dimelamine phosphate, and melamine pyrophosphate, and ammonium polyphosphate.

U.S. Pat. No. 5,021,488 A1 and U.S. Pat. No. 5,102,931 A1 describe thermoplastic, flame-retardant, non-dripping polyamide compositions whose preparation uses phosphinic esters of polyphenols, anti-dripping agents, polyfluoroethylene polymer, aramid, and/or zinc borate (hydrates), in a granular or pulverulent form.

U.S. Pat. No. 5,191,000 A1 describes flame-retardant non-dripping polyalkylene terephthalate compositions whose preparation uses phosphorous esters and anti-dripping agents, in a granular or pulverulent form.

It was therefore an object to eliminate the disadvantages of the prior art and improve the processibility of flame-retardant compositions. The invention achieves the object by treating the organophosphorus flame-retardant component with a binder and granulating the material. Surprisingly, it has been found that the uniformity of dispersion of the OPF in the polymer is improved if the OPF is used in the form of melt granules. The particles have better dispersion and give more effective flame-retardant action. Other results of the better particle distribution are seen in the surface finish and surface quality, which are better and have improved esthetic properties. Better mechanical strength properties are another possible result.

The invention therefore provides a granular flame-retardant composition composed of an organophosphorus flame-retardant component, and at least one binder.

The organophosphorus flame-retardant component preferably comprises a phosphinic salt of the formula (I) and/or a diphosphinic salt of the formula (II) and/or polymers of these (component A),

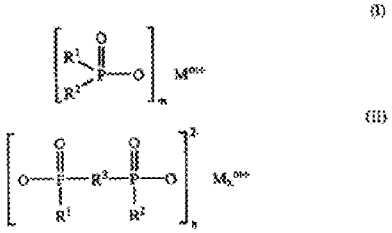

where
$R^1$ and $R^2$ are identical or different and are $C_1$-$C_6$-alkyl, linear or branched, and/or aryl;
$R^3$ is $C_1$-$C_{10}$-alkylene, linear or branched, $C_6$-$C_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, and/or a protonated nitrogen base;
m is from 1 to 4;
n is from 1 to 4;
x is from 1 to 4.
M is preferably calcium, aluminum, or zinc.

Protonated nitrogen bases are preferably the protonated bases of ammonia, melamine, or triethanolamine, in particular $NH_4^+$.

Preferred meanings of $R^1$ and $R^2$, identical or different, are $C_1$-$C_6$-alkyl, linear or branched, and/or phenyl.

Particularly preferred meanings of $R^1$ and $R^2$, identical or different, are methyl, ethyl, n-propyl, isopropyl, n-butyl, tert-butyl, n-pentyl, and/or phenyl.

Preferred meanings of $R^3$ are methylene, ethylene, n-propylene, isopropylene, n-butylene, tert-butylene, n-pentylene, n-octylene, or n-dodecylene.

Other preferred meanings of $R^3$ are phenylene or naphthylene.

Other preferred meanings of $R^3$ are methylphenylene, ethylphenylene, tert-butylphenylene, methylnaphthylene, ethylnaphthylene, or tert-butylnaphthylene.

Other preferred meanings of $R^3$ are phenylmethylene, phenylethylene, phenylpropylene, or phenylbutylene.

The granular flame-retardant composition and/or the organophosphorus flame-retardant component also preferably comprise(s) melamine phosphate, dimelamine phosphate, melamine pyrophosphate, melamine polyphosphates, melam polyphosphates, melem polyphosphates, and/or melon polyphosphates.

The granular flame-retardant composition and/or the organophosphorus flame-retardant component also preferably comprise(s) melamine condensation products, such as melam, melem, and/or melon.

Suitable substances are condensation products of melamine or reaction products of melamine with phosphoric acid, and reaction products of condensation products of melamine with phosphoric acid, and also mixtures of the products mentioned. Examples of condensation products of melamine are melem, melam, or melon, and compounds of this type but with a higher condensation level, and also mixtures of the same. One way of preparing these condensation products uses a process described in WO-A-96/16948.

The reaction products with phosphoric acid are compounds resulting from reaction of melamine or of the condensed melamine compounds, such as melam, melem, or melon, etc., with phosphoric acid. Examples of these are melamine polyphosphate, melam polyphosphate, and melem polyphosphate, and mixed polysalts, e.g. as described in PCT/WO 98/39306. The compounds mentioned have been disclosed previously in the literature, and may also be prepared via processes other than the direct reaction with phosphoric acid. For example, melamine polyphosphate may be prepared by a method based on PCT/WO 98/45364, by reacting polyphosphoric acid and melamine, or by a method based on PCT/WO 98/08898 by condensation of melamine phosphate or melamine pyrophosphate.

The granular flame-retardant composition and/or the organophosphorus flame-retardant component also preferably comprise(s) oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, dicyandiamide, and/or guanidine.

The granular flame-retardant composition and/or the organophosphorus flame-retardant component preferably comprise(s) nitrogen-containing phosphates of the formulae $(NH_4)_y H_{3-y} PO_4$ and, respectively, $(NH_4 PO_3)_z$, where y is from 1 to 3 and z is from 1 to 10 000.

The granular flame-retardant composition and/or the organophosphorus flame-retardant component preferably comprise(s), as component B, a synthetic inorganic compound and/or a mineral product.

Component B is preferably an oxygen compound of silicon, or is magnesium compounds, is metal carbonates of metals of the second main group of the Periodic Table, is red phosphorus, is zinc compounds, or is aluminum compounds.

The oxygen compounds of silicon are particularly preferably salts and esters of orthosilicic acid and condensation products thereof, or are silicates, zeolites, and silicas, are glass powder, glass/ceramic powder, or ceramic powder; the magnesium compounds are magnesium hydroxide, hydrotalcites, magnesium carbonates, or magnesium calcium carbonates; the zinc compounds are zinc oxide, zinc stannate, zinc hydroxystannate, zinc phosphate, zinc borate, or zinc sulfides; the aluminum compounds are aluminum hydroxide or aluminum phosphate.

The granular flame-retardant composition and/or the organophosphorus flame-retardant component preferably comprise(s) nitrogen compounds as further component C.

The nitrogen compounds are preferably those of the formulae (III) to (VIII) or mixtures thereof

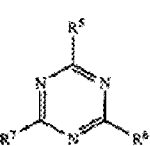

(III)

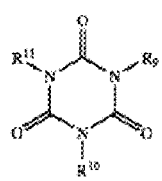

(IV)

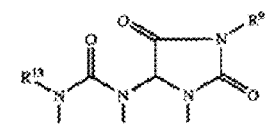

(V)

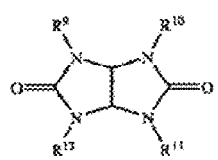

(VI)

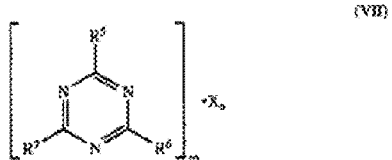

(VII)

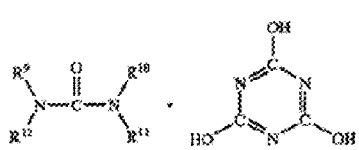

(VIII)

where
$R^5$ to $R^7$ are hydrogen, $C_1$-$C_8$-alkyl, or $C_5$-$C_{16}$-cycloalkyl or -alkylcycloalkyl, unsubstituted or substituted with a hydroxy function or with a $C_1$-$C_4$-hydroxyalkyl function, or are $C_2$-$C_8$-alkenyl, $C_1$-$C_8$-alkoxy, -acyl, or -acyloxy, are $C_6$-$C_{12}$-aryl or -arylalkyl, are -$OR^8$ or are -$N(R^8)R^9$, or else N-alicyclic systems or N-aromatic systems, $R^8$ is hydrogen, $C_1$-$C_8$-alkyl, $C_5$-$C_{16}$-cycloalkyl or -alkylcycloalkyl, unsubstituted or substituted with a hydroxy function or with a $C_1$-$C_4$-hydroxyalkyl function, or is $C_2$-$C_8$-alkenyl, $C_1$-$C_8$-alkoxy, -acyl, or -acyloxy, or is $C_6$-$C_{12}$-aryl or -arylalkyl, $R^9$ to $R^{13}$ are the groups of $R^8$, or else -$O$-$R^8$, m and n, independently of one another, are 1, 2, 3, or 4, X is acids which can form adducts with triazine compounds (III).

The granular flame-retardant composition and/or the organophosphorus flame-retardant component preferably also comprise(s) carbodiimides.

The invention also includes synergistic combinations of the abovementioned phosphinates with certain nitrogen-containing compounds, these being more effective than the phosphinates alone as flame retardants in very many polymers (DE 196 14 424 A1, DE 197 34 437 A1, and DE-197 37 727 A1). The flame-retardant action of the phosphinates may be improved via combination with other flame retardants, preferably with nitrogen-containing synergists, or with phosphorus/nitrogen flame retardants.

Preferred binders are alkylalkoxylates, and among these preference is given to the use of ethoxylated alcohols, preferably primary alcohols, preferably having from 8 to 22 carbon atoms, and preferably from 1 to 80 EO units per mole of alcohol, the alcohol radical being linear or preferably methyl-branched at the 2-position, or comprising a mixture of linear and methyl-branched radicals, as is usually the case in oxo alcohol radicals. Examples of preferred ethoxylated alcohols are $C_{11}$ alcohols having 3, 5, 7, 8 or 11 EO units, $(C_{12}-C_{15})$ alcohols having 3, 6, 7, 8, 10 or 13 EO units, $(C_{14}-C_{15})$ alcohols having 4, 7 or 8 EO units, $(C_{16}-C_{18})$ alcohols having 8, 11, 15, 20, 25, 50 or 80 EO units, and mixtures of the same, e.g. the ®Genapol grades T80, T110, T150, T200, T250, T500, T800 from Clariant GmbH. The degrees of ethoxylation given are statistical averages which for a specific product may be an integer or a non-integer. In addition to these, use may also be made of fatty alcohol-EO/PO adducts.

Other preferred binders are caprolactam and triphenyl phosphate.

The binder preferably comprises ethylene glycol, propylene glycol and/or butylene glycol, their oligomers and/or polymers and/or their ethers.

The binder preferably comprises naturally occurring, chemically modified and/or synthetic waxes, preferably carnauba waxes and montan waxes.

Waxes are naturally occurring or synthesized substances which at 20° C. are solid and kneadable, and above 40° C. undergo melting without decomposition and have low viscosity. The temperature at which waxes generally convert into the molten, low-viscosity state is from 50 to 90° C., or in exceptional cases up to about 200° C. A distinction is made between naturally occurring waxes, such as carnauba wax, chemically modified waxes, such as montan ester waxes, and synthetic waxes, such as polyethylene waxes.

Montan waxes for polymer processing are internal and external lubricants for the processing of polyvinyl chloride, polyolefins, polyamide, polystyrene, linear polyesters, thermoplastic polyurethane, curable molding compositions, and other polymers. They are downstream products from the refining of crude montan wax, which is obtained by extracting brown coal. They are long-chain carboxylic acids having chain lengths of from C28 to C32, or are their full or partial esters with ethylene glycol, glycerol, or butylene glycol, or are alkaline earth metal salts of partially hydrolyzed esters, e.g. ®Licowax E, ®Licowax WE 4, and ®Licowax OP.

Polyethylene waxes are suitable for the polymer sector (PVC, rubber, polyolefins). Examples are ®Licowax PE 520, ®Licowax PE 810, ®Licowax PE 820, ®Licowax PE 830, ®Licowax PE 840, ®Licomont CaV, ®Licolub WE4, Ceridust 5551.

The binder preferably comprises synthetic resins, particularly phenolic resins. According to DIN 55958, synthetic resins are synthetic resins prepared by a polymerization reaction, polyaddition reaction, or polycondensation reaction. An example of a preferred phenolic resin is the grade 28391 from the company Durez.

Other suitable binders are polyethylene glycols $H(OCH_2CH_2O)_nOH$ with molecular weights of from 500 to 40 000. Particular preference is given to the grades ®PEG 600, 800, 1000, 1500, 2000, 3000, 4000, 6000, 8000, 10 000, 12 000, 20 000, 35 000 from the company Clariant GmbH.

Other suitable binders are monoalkyl ethers of polyethylene glycol, monoallyl ethers of polyethylene glycol, and monovinyl ethers of polyethylene glycol.

Preferred binders are esters, amides, anhydrides, hydrates, and salts of saturated aliphatic mono-, di-, tri- and polycarboxylic acids.

Other preferred binders are $C_1$-$C_{20}$-(alkyl, oxalkyl, alkenyl, alkynyl, aralkyl, alkylaryl, or aryl) monocarboxylates, $C_1$-$C_{20}$-(alkyl, oxalkyl, alkenyl, alkynyl, aralkyl, alkylaryl, or aryl) dicarboxylates, $C_1$-$C_{20}$-(alkyl, oxalkyl, alkenyl, alkynyl, aralkyl, alkylaryl, or aryl) tricarboxylates, $C_1$-$C_{20}$-(alkyl, oxalkyl, alkenyl, alkynyl, aralkyl, alkylaryl, or aryl) oligocarboxylates, $C_1$-$C_{20}$-(alkyl, oxalkyl, alkenyl, alkynyl, aralkyl, alkylaryl or aryl) polycarboxylates.

Other preferred binders are monoorganyl or diorganyl esters of a dicarboxylic acid; monoorganyl or diorganyl, or triorganyl esters of a tricarboxylic acid; monoorganyl, diorganyl, triorganyl, or oligoorganyl esters of an oligocarboxylic acid; monoorganyl, diorganyl, triorganyl, oligoorganyl, or polyorganyl esters of a polycarboxylic acid, or a mixture of these.

Other preferred binders are esters of phthalic acid, among which are monoorganyl esters of phthalic acid and bisorganyl esters of phthalic acid (examples of organyl being alkyl, oxalkyl, alkenyl, alkynyl, aralkyl, alkylaryl or aryl), preference being given to monoalkyl esters of phthalic acid and dialkyl esters of phthalic acid (alkyl = linear, branched, cyclic, substituted cyclic, or heterocyclic $C_1$-$C_{20}$), e.g. dimethyl phthalate, diethyl phthalate, dipropyl phthalate, diisopropyl phthalate, dibutyl phthalate, epoxidized di(2-ethylhexyl) phthalate, diisooctyl phthalate, dioctyl phthalate, diisononyl phthalate, n-octyl phthalate, n-decyl phthalate, diisodecyl phthalate, butyl benzyl phthalate, butyl cyclohexyl phthalate, dicapryl phthalate, di(3,5,5-trimethylhexyl) phthalate, di(1-allyl-2,2,6,6-tetramethylpiperidin-4-yl) phthalate.

Other preferred binders are esters of isophthalic acid, among which are monoorganyl esters of isophthalic acid and bisorganyl esters of isophthalic acid (examples of organyl being alkyl, oxalkyl, alkenyl, alkynyl, aralkyl, alkylaryl, or aryl), preference being given to monoalkyl esters of isophthalic acid and dialkyl esters of isophthalic acid (alkyl = linear, branched, cyclic, substituted cyclic, or heterocyclic $C_1$-$C_{20}$), e.g. di(2-ethylhexyl) isophthalate.

Other preferred binders are esters of terephthalic acid, among which are monoorganyl esters of terephthalic acid and bisorganyl esters of terephthalic acid (examples of organyl being alkyl, oxalkyl, alkenyl, alkynyl, aralkyl, alkylaryl, or aryl), preference being given to monoalkyl esters of terephthalic acid and dialkyl esters of terephthalic acid (alkyl = linear, branched, cyclic, substituted cyclic, or heterocyclic $C_1$-$C_{20}$).

Other preferred binders are esters of oxalic acid, esters of malonic acid (e.g. di(2,2,6,6-tetramethylpiperidin-4-yl) diethylmalonate, di(1,2,2,6,6-pentamethylpiperidin-4-yl) dibutylmalonate, di(1,2,2,6,6-pentamethylpiperidin-4-yl) butyl(3,5-di-tert-butyl-4-hydroxybenzyl)malonate), esters of succinic acid (e.g. di(2,2,6,6-tetramethylpiperidin-4-yl) succinate), and esters of glutaric acid (e.g. di(2,2,6,6-tetramethylpiperidin-4-yl) glutarate).

Other preferred binders are esters of adipic acid, among which are monoorganyl esters of adipic acid and bisorganyl esters of adipic acid (examples of organyl being alkyl, oxalkyl, alkenyl, alkynyl, aralkyl, alkylaryl, or aryl), preference being given to monoalkyl esters of adipic acid and dialkyl esters of adipic acid (alkyl = linear, branched, cyclic, substituted cyclic, or heterocyclic $C_1$-$C_{20}$), e.g. dimethyl adipate, diethyl adipate, di-n-propyl adipate, diisopropyl adipate, di-n-butyl adipate, diisobutyl adipate, di-tert-butyl adipate, di(n-octyl) adipate, di(2-ethylhexyl) adipate, diisodecyl adipate, n-octyl adipate, 2-ethylhexyl adipate, n-decyl adipate, isodecyl adipate, di(2,2,6,6-tetramethylpiperidin-4-yl) adipate.

Other preferred binders are esters of pimelic acid, suberic acid, esters of azelaic acid (e.g. dialkyl azelate, particularly di(2-ethylhexyl) azelate), and esters of 1,13-tridecanedicarboxylic acid (brassylic acid).

Other preferred binders are esters of sebacic acid, among which are monoorganyl esters of sebacic acid and diorganyl esters of sebacic acid (examples of organyl being alkyl, oxalkyl, alkenyl, alkynyl, aralkyl, alkylaryl, or aryl), preference being given to monoalkyl esters of sebacic acid and dialkyl esters of sebacic acid (alkyl = linear, branched, cyclic, substituted cyclic, or heterocyclic $C_1$-$C_{20}$), e.g. dialkyl sebacate, particularly di(2-ethylhexyl) sebacate, di(2,2,6,6-tetramethylpiperidin-4-yl) sebacate, di(1,2,2,6,6-pentamethylpiperidin-4-yl) sebacate, di(1,2,3,6-tetramethyl-2,6-diethyl-piperidin-4-yl) sebacate, di(1-octyloxy-2,2,6,6-tetramethylpiperidin-4-yl) sebacate, di(1-cyclohexyloxy-2,2,6,6-tetramethylpiperidin-4-yl) sebacate.

Other preferred binders are esters of tetrahydrophthalic acid, among which are monoorganyl esters of tetrahydrophthalic acid and bisorganyl esters of tetrahydrophthalic acid (examples of organyl being alkyl, oxalkyl, alkenyl, alkynyl, aralkyl, alkylaryl, or aryl), preference being given to monoalkyl esters of tetrahydrophthalic acid and dialkyl esters of tetrahydrophthalic acid (alkyl = linear, branched, cyclic, substituted cyclic, or heterocyclic $C_1$-$C_{20}$), e.g. di(2-ethylhexyl) tetrahydrophthalate.

Other preferred binders are esters of tetrahydroisophthalic acid, among which are monoorganyl esters of tetrahydroisophthalic acid and bisorganyl esters of tetrahydroisophthalic acid (examples of organyl being alkyl, oxalkyl, alkenyl, alkynyl, aralkyl, alkylaryl, or aryl), preference being given to monoalkyl esters of tetrahydroisophthalic acid and dialkyl esters of tetrahydroisophthalic acid (alkyl = linear, branched, cyclic, substituted cyclic, or heterocyclic $C_1$-$C_{20}$).

Other preferred binders are esters of tetrahydroterephthalic acid, among which are monoorganyl esters of tetrahydroterephthalic acid and bisorganyl esters of tetrahydroterephthalic acid (examples of organyl being alkyl, oxalkyl, alkenyl, alkynyl, aralkyl, alkylaryl, or aryl), preference being given to monoalkyl esters of tetrahydroterephthalic acid and dialkyl esters of tetrahydroterephthalic acid (alkyl = linear, branched, cyclic, substituted cyclic, or heterocyclic $C_1$-$C_{20}$).

Other preferred binders are esters of hexahydrophthalic acid, among which are monoorganyl esters of hexahydrophthalic acid and bisorganyl esters of aralkyl, hexahydrophthalic acid (examples of organyl being alkyl, oxalkyl, alkenyl, alkynyl, aralkyl, alkylaryl, or aryl), preference being given to monoalkyl esters of hexahydrophthalic acid and dialkyl esters of hexahydrophthalic acid (alkyl = linear, branched, cyclic, substituted cyclic, or heterocyclic $C_1$-$C_{20}$), e.g. di(2-ethylhexyl) hexahydrophthalate.

Other preferred binders are esters of hexahydroisophthalic acid, among which are monoorganyl esters of hexahydroisophthalic acid and bisorganyl esters of aralkyl, hexahydroisophthalic acid (examples of organyl being alkyl, oxalkyl, alkenyl, alkynyl, alkylaryl, or aryl), preference being given to monoalkyl esters of hexahydroisophthalic acid and dialkyl esters of hexahydroisophthalic acid (alkyl = linear, branched, cyclic, substituted cyclic, or heterocyclic $C_1$-$C_{20}$).

Other preferred binders are esters of hexahydroterephthalic acid, among which are monoorganyl esters of hexahydroterephthalic acid and bisorganyl esters of hexahydroterephthalic acid (examples of organyl being alkyl, oxalkyl, alkenyl, alkynyl, aralkyl, alkylaryl, or aryl), preference being given to monoalkyl esters of hexahydroterephthalic acid and dialkyl esters of hexahydroterephthalic acid (alkyl = linear, branched, cyclic, substituted cyclic, or heterocyclic $C_1$-$C_{20}$).

Other preferred binders are esters of maleic acid, among which are monoorganyl esters of maleic acid and bisorganyl esters of maleic acid (examples of organyl being alkyl, oxalkyl, alkenyl, alkynyl, aralkyl, alkylaryl, or aryl), preference being given to monoalkyl esters of maleic acid and dialkyl esters of maleic acid (alkyl = linear, branched, cyclic, substituted cyclic, or heterocyclic $C_1$-$C_{20}$), e.g. di(1-benzyl-2,2,6,6-tetramethylpiperidin-4-yl) maleate.

Other preferred binders are esters of hydroxycarboxylic acids, hydroxydicarboxylic acids, hydroxytricarboxylic acids, hydroxyoligocarboxylic acids, and/or hydroxypolycarboxylic acids, e.g. tartronic acid, malic acid, tartaric acid, citric acid, etc.

Other preferred binders are esters of citric acid, among which are monoorganyl esters of citric acid and bisorganyl esters of citric acid (examples of organyl being alkyl, oxalkyl, alkenyl, alkynyl, aralkyl, alkylaryl, or aryl), preference being given to monoalkyl esters of citric acid and dialkyl esters of citric acid (alkyl = linear, branched, cyclic, substituted cyclic, or heterocyclic $C_1$-$C_{20}$).

Other preferred binders are butyl epoxystearate, hexyl epoxystearate, epoxidized soy oil, epoxidized octyl tallate, epoxidized octyl oleate, tetraethylene glycol di(2-ethylhexoate), and triethyleneglycol di(2-ethylhexoate).

Other preferred binders are esters of mono-, di-, tri-, tetra-, or pentahydric alcohols, and those of higher polyols.

Other preferred binders are mono-, di-, tri-, or tetraorganyl esters of pentaerythritol, and mixtures of these, e.g. pentaerythritol tetrabenzoate.

Other preferred binders are sulfonamide-based compounds, particularly preferably aromatic sulfonamides, e.g. N-ethyltoluenesulfonamide, N-cyclohexyltoluenesulfonamide, N-butylbenzenesulfonamide, N-methylbenzenesulfonamide, N-butylbenzenesulfonamide, p-toluenesulfonamide, N-ethyl-p-toluenesulfonamide, and N-cyclohexyl-p-toluenesulfonamide.

Other preferred binders are glycerol, hexyl glycol, and modified urethane prepolymer which has a weight-average molecular weight of from 400 to 2 000, preferably from 600 to 1 000.

Other preferred binders are esters of p-hydroxybenzoic acid, e.g. hexyloxyethoxyethyl p-hydroxybenzoate, hexyloxypropoxypropyl p-hydroxybenzoate, hexyloxybutoxybutyl p-hydroxybenzoate, octyloxyethoxyethyl p-hydroxybenzoate, octyloxypropoxypropyl p-hydroxybenzoate, octyloxybutoxybutyl p-hydroxybenzoate, 2'-ethylhexyloxyethoxyethyl p-hydroxybenzoate, 2'-ethylhexyloxypropoxypropyl p-hydroxybenzoate, 2'-ethylhexyloxybutoxybutyl p-hydroxybenzoate, decyloxyethoxyethyl p-hydroxybenzoate, decyloxypropoxypropyl p-hydroxybenzoate, decyloxybutoxybutyl p-hydroxybenzoate.

Other preferred binders are alkyl esters of p-hydroxybenzoic acid, e.g. octyl p-hydroxybenzoate, 2-ethylhexyl p-hydroxybenzoate, heptyl p-hydroxybenzoate, 2-ethyldecyl p-hydroxybenzoate, 2-octyloctyl p-hydroxybenzoate, and 2-decyldodecyl p-hydroxybenzoate.

Other preferred binders are phenols, such as beta-naphthol, dibenzylphenol, and octylcresol.

Phosphorus compounds of oxidation state +5 which may be used are especially alkyl- and aryl-substituted phosphates. Examples are phenyl bisdodecyl phosphate, phenyl ethyl hydrogenphosphate, phenyl bis(3,5,5-trimethylhexyl) phosphate, ethyl diphenyl phosphate, 2-ethylhexyl di(tolyl) phosphate, diphenyl hydrogenphosphate, bis(2-ethylhexyl) p-tolyl phosphate, tritolyl phosphate, bis(2-ethylhexyl) phenyl phosphate, di(nonyl) phenyl phosphate, phenyl methyl hydrogenphosphate, di(dodecyl) p-tolyl phosphate, p-tolyl bis(2,5,5-trimethylhexyl) phosphate, or 2-ethylhexyl diphenyl phosphate. Triphenyl phosphate, and resorcinol bis (diphenyl phosphate) (RDP) and its ring-substituted derivatives are very particularly suitable.

Other preferred binders are tri(butoxyethyl) phosphate, tricctyl phosphate, tricresyl phosphate, 2-ethylhexyl diphenyl phosphate, cresyl diphenyl phosphate.

Other preferred binders are organic salts of polyvalent metals, particularly preferably organic salts of elements of the second, third, or fourth main group, or of the second transition group, particularly of the elements magnesium, calcium, strontium, barium, zinc, cadmium, aluminum, tin, lead. Particular preference is given to carboxylic acids having at least 12 carbon atoms, dodecanoic acid (lauric acid), coconut acid, tetradecanoic acid (myristic acid), hexadecanoic acid (palmitic acid, cetylic acid), octadecanoic acid (stearic acid), cis-9-octadecenoic acid (oleic acid), trans-9-octadecenoic acid (elaidic acid), eicosanoic acid (arachidic acid), docosanoic acid (behenic acid).

The median particle size of the organophosphorus flame-retardant component is from 0.1 to 1 000 μm, preferably from 1 to 100 μm.

The median particle size of the granular flame-retardant composition is from 100 to 10 000 μm, preferably from 200 to 2 000 μm.

The preferred bulk density of the organophosphorus flame-retardant component is from 80 to 800 g/l, particularly preferably from 200 to 800 g/l.

The preferred bulk density of the granular flame-retardant composition is from 200 to 1 500 g/l, particularly preferably from 300 to 700 g/l.

The preferred ratio of the amount of binder to that of organophosphorus component is from 1:99 to 1:0.11, preferably from 1:49 to 1:0.25, particularly preferably from 1:19 to 1:1.

The melting/drop point of the binder is preferably from 50 to 200° C.

The preferred process for preparing the granular flame-retardant composition of the invention is melt agglomeration. In this process, a binder is partially melted via exposure to external heat and via heat generated by shear forces. This acts in combination with the shear forces introduced to enlarge the solid particles. In the agglomerates which form, the solid particles are held together via binder bridges which form.

In one embodiment, the inventive granular flame-retardant composition may be prepared by adding, in a suitable mixer, the binder in liquid form to the organophosphorus flame-retardant component, which has been set in motion, and mixing for from 0.01 to 1 hour at from 50 to 300° C.

In one embodiment, the inventive granular flame-retardant composition may be prepared by adding, in a suitable mixer, the solid binder to the organophosphorus flame-retardant component, which has been set in motion, mixing for from 0.01 to 1 hour at 50 to 300° C., and, previously/simultaneously/subsequently heating to the melting point of the binder.

Suitable mixers may be: plowshare mixers from the company Lödige, rotating-disc mixers from the company Lödige, (e.g. CB30), Flexomix mixers from the company Schugi, HEC rotating-disc mixers from the company Niro, rotating-disc mixers (e.g. K-TTE4) from the company Drais, Mannheim, Germany, Eirich mixers (e.g. R02), Telschig mixers (WPA6), Hauf mixers, (the last two mixers using the free-fall principle of operation), zig-zag mixers from the company Niro, and mixers from the company Nauta, in which the mix is circulated by a screw, using the Archimedes principle.

The product mixture initially produced is dried in a suitable dryer, and, respectively, annealed to continue build-up of the grains. Dryers of the invention may be: fluidized-bed dryers from the company Hosokawa Schugi (Schugi Fluid-Bed, Vometec fluidized-bed dryers), fluidized-bed dryers from the company Waldner or from the company Glatt, turbo-fluidized-bed dryers from the company Waldner, spin-flash dryers from the company Anhydro, or else drum dryers.

Preferred operating conditions in the fluidized-bed dryer are: air inlet temperature from 120 to 280° C., product temperature from 20 to 200° C.

In one embodiment, the inventive granular flame-retardant composition may be prepared by melting the organophosphorus flame-retardant component with a binder, and freezing the material in the form of drops. The melting process may take place in a kneader, in a stirred tank, or in similar assemblies. It is preferable to freeze the melt in a fluidized bed, pelletizing pan, or on a metal belt.

The residual moisture level of the inventive granular flame-retardant composition is from 0.01 to 10%, preferably from 0.05 to 1%.

The invention also provides a flame-retardant polymer molding composition which comprises the inventive granular flame-retardant composition.

The flame-retardant polymer molding composition preferably comprises from 1 to 50% by weight of granular flame-retardant composition, from 1 to 99% by weight of thermoplastic polymer or a mixture of the same from 0 to 60% by weight of additives from 0 to 60% by weight of filler.

The flame-retardant polymer molding composition particularly preferably comprises from 5 to 30% by weight of granular flame-retardant composition, from 5 to 90% by weight of thermoplastic polymer or a mixture of the same from 5 to 40% by weight of additives from 5 to 40% by weight of filler.

The flame-retardant polymer molding composition preferably also comprises component B and/or C, as described above.

The thermoplastic polymers are preferably HI (high-impact) polystyrene, polyphenylene ethers, polyamides, polyesters, polycarbonates, or blends or polyblends of the type represented by ABS (acrylonitrile-butadiene-styrene), or PC/ABS (polycarbonate/acrylonitrile-butadiene-styrene).

The thermoplastic polymers are particularly preferably polyamide, polyester, or ABS.

Finally, the invention also provides polymer moldings, polymer films, polymer filaments, or polymer fibers, comprising the granular flame-retardant composition of the invention.

The polymer of the polymer moldings, polymer films, polymer filaments, or polymer fibers is a thermoplastic or thermoset polymer.

The thermoplastic polymers are preferably HI (high-impact) polystyrene, polyphenylene ethers, polyamides, polyesters, polycarbonates, or blends or polyblends of the type represented by ABS (acrylonitrile-butadiene-styrene), or PC/ABS (polycarbonate/acrylonitrile-butadiene-styrene), polyamide, polyester, and/or ABS.

Preferred thermoplastic polymers are polyethylene (PE), polypropylene (PP), polystyrene (PS), polyvinyl chloride (PVC), polyacrylonitrile (PAN), and polyacrylates.

The thermoset polymers are preferably formaldehyde polymers, epoxy polymers, melamine polymers, or phenolic resin polymers, and/or polyurethanes.

The polymer moldings, polymer films, polymer filaments, or polymer fibers preferably comprise from 1 to 50% by weight of granular flame-retardant composition, from 1 to 99% by weight of polymer or a mixture of the same from 0 to 60% by weight of additives from 0 to 60% by weight of filler.

The polymer moldings, polymer films, polymer filaments, or polymer fibers particularly preferably comprise from 5 to 30% by weight of granular flame-retardant composition, from 5 to 90% by weight of polymer or a mixture of the same from 5 to 40% by weight of additives from 5 to 40% by weight of filler.

The inventive granular flame-retardant composition is preferably used in compounded materials which are in turn used to produce polymer moldings.

The invention also includes polymer moldings which comprise the inventive granular flame-retardant composition.

The flame-retardant components may be incorporated into thermoplastic polymers, for example by premixing all of the constituents in the form of powders and/or granulated materials in a mixer, and then homogenizing in the polymer melt in a compounding assembly (e.g. a twin-screw extruder). The melt is usually drawn off in the form of a strand, cooled, and pelletized. The components may also be introduced separately by way of a feed system directly into the compounding assembly.

It is also possible to admix the flame-retardant additions with ready-to-use polymer pellets and, respectively, ready-to-use polymer powder, and to process the mixture directly in an injection-molding machine to give moldings.

Preferred fillers are glass (preferably in bead form or in fiber form), oxides and/or hydroxides of the elements of the second or third main group of the Periodic Table of the Elements (preferably aluminum and magnesium), phyllosilicates, and clay minerals, e.g. bentonites, montmorillonites, hectorites, saponites, precipitated/fumed/crystalline/amorphous silicas, chalk.

Preferred additives are synergists, antioxidants, light stabilizers, lubricants, colorants, nucleating agents, or antistatic agents. Examples of additives which can be used are given in EP 0 584 567 A1.

The invention also provides an intumescent flame-retardant coating comprising at least from 1 to 50% of granular flame-retardant composition from 0 to 60% of ammonium polyphosphate.

Experimental section

Determination of particle size distribution in the granular flame-retardant composition of the invention by sieve analysis:

The inserts with appropriate sieves are used in a Retsch sieving machine. The mesh width of the sieves here decreases from the top to the bottom. 50 g of the powder to be tested are applied to the widest sieve. The vibratory movement of the sieving machine causes the pulverulent material to move through the various sieves. The residues on the sieves are weighed, and a calculation is made to relate these to the weight of material used. From the values it is possible to calculate the $d_{50}$ value.

Determination of particle size distribution using the Microtrac Granulometer

Particle size in aqueous dispersion is determined with the aid of a Microtrac ASVR/FRA Granulometer from the company Leeds and Northrup. The degree of reflection or scattering of a laser beam is measured as it penetrates the dispersion. For this, 400 ml of ethanol are pumped through the laser measurement cell. The solid specimen (e.g. 70 mg) is metered in automatically, and after 10 mm the particle size distribution is determined. The evaluation unit of the equipment calculates the $d_{50}$ value and the $d_{90}$ value.

Preparation, processing, and testing of flame-retardant compounded materials and polymer moldings The flame-retardant components are mixed with the polymer granules and, where appropriate, with additives, and incorporated in a twin-screw extruder (Leistritz LSM 30/34) at temperatures of from 230 to 260° C. (GR PBT) and, respectively, from 260 to 280° C. (GR PA 66). The homogenized polymer strand is drawn off, cooled in the waterbath, and then granulated.

After adequate drying, the molding compositions are processed on an injection molding machine (Aarburg Allrounder) at melt temperatures of from 240 to 270° C. (GR PBT) and, respectively, from 260 to 290° C. (GR PA 66) to give test specimens, and tested and classified for flame retardancy, using the UL 94 test (Underwriters Laboratories).

Example 1 (inventive)

1 276 g of aluminum diethylphosphinate (median particle diameter $d_{50}$ =3 μm) are mixed with 224 g of ®Licowax E in an Eirich laboratory mixer, and heated. Mixing is continued until the granulation process begins. The raw material is cooled and sieved. This gives 58.4% by weight of correct-size melt granules (from 400 to 1 400 μm).

Example 2 (inventive)

1 394 g of aluminum diethylphosphinate are mixed with 106 g of ®Licowax E in an Eirich laboratory mixer, and heated. Mixing is continued until the granulation process begins. The raw material is cooled and sieved. This gives 36.7% by weight of correct-size melt granules (from 400 to 1 400 μm).

Example 3 (inventive)

1 470 g of aluminum diethylphosphinate are mixed with 30 g of ®Licowax E in an Eirich laboratory mixer, and heated. Mixing is continued until the granulation process begins. The raw material is cooled and sieved. This gives 13% by weight of correct-size melt granules (from 400 to 1 400 μm).

Example 4 (inventive)

1 395 g of aluminum diethylphosphinate (median particle diameter $d_{50}$ =56 μm) are mixed with 105 g of ®Licowax PE 520 in an Eirich laboratory mixer, and heated. Mixing is continued until the granulation process begins. The raw material is cooled and sieved. This gives 36.6% by weight of correct-size melt granules (from 400 to 1 400 μm).

Example 5 (inventive)

1 395 g of aluminum diethylphosphinate are mixed with 105 g of ®Licolub WE4FI in an Eirich laboratory mixer, and heated. Mixing is continued until the granulation process begins. The raw material is cooled and sieved. This gives 38.8% by weight of correct-size melt granules (from 400 to 1 400 μm).

Example 6 (inventive)

1 425 g of aluminum diethylphosphinate are mixed with 75 g of ®Genapol TS00 in an Eirich laboratory mixer, and heated. Mixing is continued until the granulation process begins. The raw material is cooled and sieved. This gives 23% by weight of correct-size melt granules (from 400 to 1 400 μm).

Example 7 (inventive)

1 425 g of aluminum diethylphosphinate are mixed with 75 g of ®PEG 6000 in an Eirich laboratory mixer, and heated. Mixing is continued until the granulation process begins. The raw material is cooled and sieved. This gives 32.1% by weight of correct-size melt granules (from 400 to 1 400 µm).

Example 8 (inventive)

1 500 g of Melapur®MP melamine polyphosphate (melamine phosphate) from the company DSM Melapur, NL are mixed with 1 500 g of aluminum diethylphosphinate for 5 min in a Hobart mixer.

Example 9 (inventive)

1 425 g of organophosphorus flame-retardant component from example 8 are mixed with 75 g of ®Licowax E in an Eirich laboratory mixer, and heated. Mixing is continued until the granulation process begins. The raw material is cooled and sieved. This gives 29.8% by weight of correct-size melt granules (from 400 to 1 400 µm).

Example 10 (inventive)

750 g of aluminum diethylphosphinate are mixed with 750 g of Durez resin grade 28391 in a laboratory kneader, and melted. The melt is transferred dropwise to a metal belt, and freezes. This gives flat, drop-shaped pellets with a diameter of about 6 mm.

Example 11 (comparison)

In accordance with the general specification, a mixture of 57.5% by weight of nylon-6,6 (®Ultramid A3), 30% by weight of glass fibers (®Vetrotex EC 10 4.5 mm 98 A), and 12.5% by weight of aluminum diethylphosphinate is cast to give test specimens. Visual sampling reveals white inhomogeneities on the test specimen surface. Performance in the UL 94 fire test is inadequate for V-1 classification.

Example 12 (inventive)

In accordance with the general specification, a mixture of 57.5% by weight of nylon-6,6 (®Ultramid A3), 30% by weight of glass fibers (®Vetrotex EC 10 4.5 mm 98 A), and 12.5% by weight of granular flame-retardant composition from example 1 is cast to give test specimens. Visual sampling reveals that the test specimen surface is free from inhomogeneities. In the UL 94 fire test, V-0 classification is achieved.

Example 13 (inventive)

In accordance with the general specification, a mixture of 57.5% by weight of nylon-6,6 (®Ultramid A3), 30% by weight of glass fibers (®Vetrotex EC 10 4.5 mm 98 A), and 12.5% by weight of granular flame-retardant composition from example 4 is cast to give test specimens. Visual sampling reveals that the test specimen surface is free from inhomogeneities. In the UL 94 fire test, V-0 classification is achieved.

Example 14 (inventive)

20 parts of the flame-retardant from example 1 are mixed with 50 parts of polybutylene terephthalate pellets and 30 parts of glass fibers, and incorporated in a twin-screw extruder (Leistritz LSM 30/34) at temperatures of from 230 to 260° C. (GR PBT). The homogenized polymer strand is drawn off, cooled in a water bath, and then pelletized. After adequate drying, the pellets are processed on an injection molding machine (Aarburg Allrounder) at melt temperatures of from 240 to 270° C. (GR PBT) to give moldings. In the UL 94 fire test, the V-0 classification is achieved.

TABLE 1

Properties of granular flame-retardant compositions

| Example | *OPP Weight used g | Binder Type | Weight used g | Weight used % | Product Undersize particles <400µ % | Correct-size particles % | Oversize particles >1400µ % | Bulk density g/l |
|---|---|---|---|---|---|---|---|---|
| Starting material | — | — | — | — | — | — | — | 160 |
| Ex 1 | | | | | | | | |
| 1 | 1 276 | Licowax E | 224 | 15 | 9.7 | 58.4 | 31.9 | 857 |
| 2 | 1 394 | Licowax E | 106 | 7 | 21.2 | 36.7 | 42.1 | 488 |
| 3 | 1 470 | Licowax E | 30 | 2 | 82.5 | 13 | 4.5 | 305 |
| 4 | 1 395 | Licowax PE 520 | 105 | 7 | 56.3 | 36.6 | 7.1 | 661 |
| 5 | 1 395 | Licolub WE4FT | 105 | 7 | 27.9 | 38.8 | 33.3 | 646 |
| 6 | 1 425 | Genapol T500 | 75 | 5 | 27 | 23 | 50 | 589 |
| 7 | 1 425 | PEG 6000 | 75 | 5 | 25.6 | 32.1 | 42.3 | 570 |
| 9 | 1 425 | Licowax E | 75 | 5 | 37.8 | 29.8 | 32.4 | 617 |
| 10 | 750 | Durez resin grade 28391 | 750 | 50 | — | — | — | 753 |

*OPP: organophosphorus flame-retardant component

TABLE 2

Compositions of moldings and test results

| | Composition of molding | | | | Tests on moldings | | |
|---|---|---|---|---|---|---|---|
| Example | *OPF % by weight | **GFR % by weight | Glass fiber % by weight | Nylon-6,6 % by weight | Visual | UL 94 fire test | Comments |
| 11 | 12.5 | — | 30 | 57.5 | inhomogeneous | V-1 | OPF: from Ex. 1 |
| 12 | — | 12.5 | 30 | 57.5 | homogeneous | V-0 | GFR: from Ex. 1 |
| 13 | — | 12.5 | 30 | 57.5 | homogeneous | V-0 | GFR: from Ex. 9 |
| 14 | — | 20 | 30 | 50 | homogeneous | V-0 | GFR: from Ex. 1 |

*OPF: organophosphorus flame-retardant Component
**GFR: granular flame-retardant Composition

The invention claimed is:

1. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol, wherein the organophosphorus flame retardant is selected from the group consisting of a phosphinic salt of the formula (I), a diphosphinic salt of the formula (II), a polymer of the phosphinic salt of formula (I), a polymer of the diphosphinic salt of formula (II) and mixtures thereof (component A),

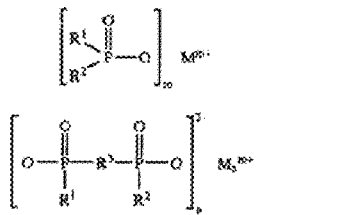

where
- $R^1$ and $R^2$ are identical or different and are $C_1$-$C_6$-alkyl, linear or branched, or aryl;
- $R^3$ is $C_1$-$C_{10}$-alkylene, linear or branched, $C_6$-$C_{10}$-arylene, -alkylarylene, or -arylalkylene;
- M is Mg, Ca, Al, Sb, Sn, Ge, Ti, Zn, Fe, Zr, Ce, Bi, Sr, Mn, Li, Na, K, or a protonated nitrogen base;
- m is from 1 to 4;
- n is from 1 to 4;
- x is from 1 to 4.

2. The granular flame-retardant composition as claimed in claim 1, wherein M is calcium, aluminum or zinc.

3. The granular flame-retardant composition as claimed in claim 1, wherein $R^1$ and $R^2$ are identical or different and are $C_1$-$C_6$-alkyl, linear or branched, or phenyl.

4. The granular flame-retardant composition as claimed in claim 1, wherein $R^1$ and $R^2$ are identical or different, and are methyl, ethyl, n-propyl, isopropyl, n-butyl, tert-butyl, n-pentyl, or phenyl.

5. The granular flame-retardant composition as claimed in claim 1, wherein $R^3$ is methylene, ethylene, n-propylene, isopropylene, n-butylene, tert-butylene, n-pentylene, n-octylene, or n-dodecylene; phenylene; naphthylene; methylphenylene, ethylphenylene, tert-butylphenylene, methylnaphthylene, ethylnaphthylene, tert-butylnaphthylene; phenylmethylene, phenylethylene, phenylpropylene, or phenylbutylene.

6. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises a compound selected from the group consisting of melamine phosphate, dimelamine phosphate, melamine pyrophosphate, melamine polyphosphates, melam polyphosphates, melem polyphosphates, and melon polyphosphates.

7. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises at least one melamine condensation product selected from the group consisting of melam, melem, and melon.

8. The granular flame-retardant composition as claimed in claim 1, wherein the composition further comprises a compound selected from the group consisting of oligomeric esters of tris(hydroxyethyl) isocyanurate with aromatic polycarboxylic acids, benzoguanamine, tris(hydroxyethyl) isocyanurate, allantoin, glycoluril, melamine, melamine cyanurate, dicyandiamide, and guanidine.

9. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises nitrogen-containing phosphates of the formulae $(NH_4)_y H_{3-y}PO_4$ and, respectively, $(NH_4PO_3)_z$, where y is from 1 to 3 and z is from 1 to 10 000.

10. A granular flame-retardant composition comprising an organophosphorus flame-retardant component, and of at least one binder wherein the at least one binder is selected from the group consisting of alkylalkoxylates having from 8 to 22 carbon atoms and from 1 to 80 EO units per mole of alcohol, caprolactam, triphenyl phosphate, ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and wherein the composition further comprises as component B, a compound selected from the group consisting of a synthetic inorganic compound and a mineral product.

11. The granular flame-retardant composition as claimed in claim 10, wherein component B is selected from the group consisting of an oxygen compound of silicon, magnesium compounds, metal carbonates of metals of the second main group of the Periodic Table, red phosphorus, zinc compounds, and aluminum compounds.

12. The granular flame-retardant composition as claimed in claim 11, wherein the oxygen compounds of silicon is selected from the group consisting of salts and esters of orthosilicic acid and condensation products thereof, silicates, zeolites, silicas, glass powder, glass/ceramic powder, and ceramic powder; wherein the magnesium compounds are selected from the group consisting of magnesium hydroxide, hydrotalcites, magnesium carbonates, and magnesium calcium carbonates; wherein the zinc compounds are selected from the group consisting of zinc oxide, zinc stannate, zinc hydroxystannate, zinc phosphate, zinc borate, and zinc sulfides; and wherein the aluminum compounds are selected from the group consisting of aluminum hydroxide and aluminum phosphate.

13. The granular flame-retardant composition as claimed in claim 1, wherein the composition further comprises at least one nitrogen compound as further component C.

14. The granular flame-retardant composition as claimed in claim 13, wherein the nitrogen compounds are those of the formulae (III) to (VIII) or mixtures thereof

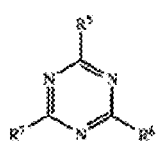

(III)

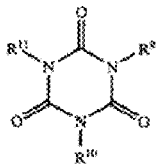

(IV)

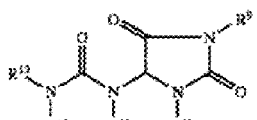

(V)

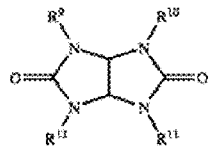

(VI)

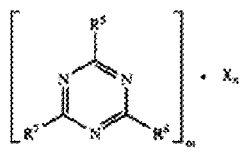

(VII)

(VIII)

where $R^5$ to $R^7$ are hydrogen, $C_1$-$C_8$-alkyl, or $C_6$-$C_{16}$-cycloalkyl or -alkylcycloalkyl, unsubstituted or substituted with a hydroxy function or with a $C_1$-$C_4$-hydroxyalkyl function, $C_2$-$C_8$-alkenyl, $C_1$-$C_8$-alkoxy, -acyl, -acyloxy, $C_6$-$C_{12}$-aryl -arylalkyl, —$OR^8$, —$N(R^8)R^9$, N-alicyclic systems or N-aromatic systems, $R^8$ is hydrogen, $C_1$-$C_8$-alkyl, $C_5$-$C_{16}$-cycloalkyl or -alkylcycloalkyl, unsubstituted or substituted with a hydroxy function or with a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, $R^9$ to $R^{13}$ are the groups of $R^8$, or —O—$R^8$, m and n, independently of one another, are 1, 2, 3, or 4, X is an acid which can form adducts with triazine compounds (III).

15. A granular flame-retardant composition comprising an organophosphorus flame-retardant component, and at least one binder, and wherein the composition further comprises at least one carbodiimide.

16. A granular flame-retardant composition comprising an organophosphorus flame-retardant component, and at least one binder, wherein the at least one binder comprises alkylalkoxylates having from 8 to 22 carbon atoms and from 1 to 80 EO units per mole of alcohol.

17. A granular flame-retardant composition comprising an organophosphorus flame-retardant component, and of at least one binder, wherein the at least one binder is selected from the group consisting of caprolactam and triphenyl phosphate, wherein the organophosphorus flame retardant is selected from the group consisting of a phosphinic salt of the formula (I), a diphosphinic salt of the formula (II), a polymer of the phosphinic salt of formula (I), a polymer of the diphosphinic salt of formula (II) and mixtures thereof (component A).

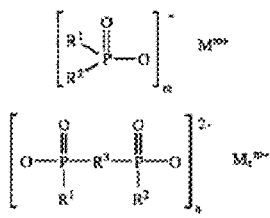

where
R¹ and R² are identical or different and are $C_1$-$C_8$-alkyl, linear or branched, or aryl;
R³ is $C_1$-$C_{10}$-alkylene, linear or branched, $C_6$-$C_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, or a protonated nitrogen base;
m is from 1 to 4;
n is from 1 to 4;
x is from 1 to 4.

18. A granular flame-retardant composition comprising an organophosphorus flame-retardant component, and of at least one binder, wherein the at least one binder is selected from the group consisting of ethylene glycol, propylene glycol, butylene glycol, oligomers of ethylene glycol, propylene glycol or butylene glycol, polymers of ethylene glycol, propylene glycol or butylene glycol, ethers of ethylene glycol, propylene glycol or butylene glycol and mixtures thereof.

19. The granular flame-retardant composition as claimed claim 1, wherein the composition has a median particle size of from 100 to 10 000 μm.

20. The granular flame-retardant composition as claimed in claim 1, wherein the composition has an average bulk density of from 200 to 1 500 g/L.

21. The granular flame-retardant composition as claimed in claim 1; wherein the ratio of the amount of the at least one binder to that of the organophosporus flame-retardant component is from 1:99 to 1:0.11.

22. A process for preparing granular flame-retardant composition, comprising the steps of adding, in a mixer, at least one binder in liquid form to an organophosphorus flame-retardant component, which has been set in motion, and mixing for a time period of from 0.01 to 1 hour at a temperature between 50 to 300° C.

23. A process for preparing granular flame-retardant composition, comprising the steps of adding, in a mixer, at least one binder in solid form to an organophosporus flame-retardant component, which has been set in motion, mixing at a temperature from 50 to 300° C. for from 0.01 to 1 hour, and during the process heating to the melting point of the at least one binder.

24. A flame-retardant polymer molding composition comprising a granular flame-retardant composition as claimed in claim 1.

25. The flame-retardant polymer molding composition as claimed in claim 24 further comprising
from 1 to 50% by weight of granular flame-retardant composition,
from 1 to 99% by weight of thermoplastic polymer or a mixture of thermoplastic polymers, and
from 0 to 60% by weight of filler.

26. The flame-retardant polymer molding composition as claimed in claim 24, further comprising
from 5 to 30% by weight of granular flame-retardant composition,
from 5 to 90% by weight of the thermoplastic polymer or a mixture of thermoplastic polymers, and
from 5 to 40% by weight of filler.

27. The flame-retardant polymer molding composition as claimed in claim 24, further comprising at least one of at least one nitrogen compound and a synthetic inorganic compound or mineral product.

28. The flame-retardant polymer molding composition as claimed in claim 25, wherein the thermoplastic polymer or mixture of thermoplastic polymers are selected from the group consisting of HI (high-impact) polystyrene, polyphenylene ethers, polyamides, polyesters, polycarbonates, and blends or polyblends represented by ABS (acrylonitrile-butadiene-styrene), or PC/ABS (polycarbonate/acrylonitrile-butadiene-styrene).

29. The flame-retardant polymer molding composition as claimed in claim 25, wherein the thermoplastic polymer or the mixture of thermoplastic polymers are selected from the group consisting of polyamide, polyester, and ABS.

30. A polymer article comprising a granular flame-retardant composition as claimed in claim 1, wherein the article is selected from the group consisting of a polymer molding, a polymer film, a polymer filament and a polymer fiber.

31. A polymer article as claimed in claim 30; wherein the polymer is a thermoplastic or thermoset polymer.

32. A polymer article as claimed in claim 31, wherein the thermoplastic polymer is selected from HI (high-impact) polystyrene, polyphenylene ethers, polyamides, polyesters, polycarbonates, or blends or polyblends represented by ABS (acrylonitrile-butadiene-styrene), or PC/ABS (polycarbonate/acrylonitrile-butadiene-styrene), polyamide, polyester, and ABS.

33. A polymer article as claimed in claim 31, wherein the thermoset polymer is selected from the group consisting of formaldehyde polymers, epoxy polymers, melamine polymers, or phenolic resin polymers, and polyurethanes.

34. A polymer article as claimed in claim 30, comprising
from 1 to 50% by weight of granular flame-retardant composition,
from 1 to 99% by weight of polymer or a mixture of polymers, and
from 0 to 60% by weight of filler.

35. A polymer article as claimed in claim 30, comprising:
from 5 to 30% by weight of granular flame-retardant composition,
from 5 to 90% by weight of polymer or a mixture of polymers, and
from 5 to 40% by weight of filler.

36. The granular flame-retardant composition as claimed in claim 1, wherein the at least one binder is selected from the group consisting of carnauba waxes and montan waxes.

37. A granular flame-retardant composition comprising an organophosphorus flame-retardant component, and of at least one binder, wherein the at least one binder comprises phenolic resins, wherein the organophosphorus flame retardant is selected from the group consisting of a phosphinic salt of the formula (I), a diphosphinic salt of the formula (II), a polymer of the phosphic salt of formula (I), a polymer of the diphosphinic salt of formula (II) and mixtures thereof (component A),

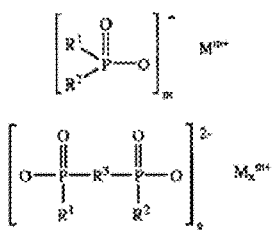

where
- $R^1$ and $R^2$ are identical or different and are $C_1$-$C_6$-alkyl, linear or branched, or aryl;
- $R^3$ is $C_1$-$C_{10}$-alkylene, linear or branched, $C_6$-$C_{10}$-arylene, -alkylarylene, or -arylalkylene;
- M is Mg, Ca, Al, Sb, Sn, Ge, Ti, Zn, Fe, Zr, Ce, Bi, Sr, Mn, Li, Na, K, or a protonated nitrogen base;
- m is from 1 to 4;
- n is from 1 to 4;
- x is from 1 to 4.

38. The granular flame retardant composition as claimed in claim 1, wherein the composition has a median particle size from 200 to 2000 μm.

39. The granular flame-retardant composition as claimed in claim 1, wherein the composition has an average bulk density of from 300 to 800 g/l.

40. The granular flame-retardant composition as claimed in claim 1, wherein the ratio of the amount of the at least one binder to that of the organophosporus flame-retardant component is from 1:49 to 1:0.25.

41. The granular flame-retardant composition as claimed in claim 1, wherein the ratio of the amount of the at least one binder to that of the organophosporus flame-retardant component is from 1:19 to 1:1.

42. A flame retardant polymer molding composition comprising a granular flame-retardant composition as claimed in claim 15.

43. A flame retardant polymer molding composition comprising a granular flame-retardant composition as claimed in claim 16.

44. A flame retardant polymer molding composition comprising a granular flame-retardant composition as claimed in claim 17.

45. A flame retardant polymer molding composition comprising a granular flame-retardant composition as claimed in claim 18.

46. A granular flame-retardant composition made in accordance with the process of claim 22.

47. A flame retardant polymer molding composition comprising a granular flame-retardant composition as claimed in claim 46.

48. A granular flame-retardant composition made in accordance with the process of claim 23.

49. A flame retardant polymer molding composition comprising a granular flame-retardant composition as claimed in claim 48.

* * * * *